United States Patent [19]
Coelho et al.

[11] Patent Number: 5,748,196
[45] Date of Patent: May 5, 1998

[54] IMPLEMENTING BRANCHING OPERATIONS AT PROCESSING INTERSECTIONS IN INTERACTIVE APPLICATIONS

[75] Inventors: Rohan G. F. Coelho; Alan Packer, both of Portland; Gary Baldes, Hillsboro, all of Oreg.

[73] Assignee: Intel Corporation, Santa Clara, Calif.

[21] Appl. No.: 568,023

[22] Filed: Dec. 6, 1995

Related U.S. Application Data

[63] Continuation of Ser. No. 388,699, Feb. 15, 1995, Pat. No. 5,646,866.

[51] Int. Cl.$^6$ .................................................. G06T 11/00
[52] U.S. Cl. .................................................. 345/433
[58] Field of Search .................................... 395/133, 137, 395/806, 807, 141, 173-175, 326, 327, 328; 345/433

[56] References Cited

U.S. PATENT DOCUMENTS

| | | | |
|---|---|---|---|
| 5,265,248 | 11/1993 | Moulios et al. | 395/806 |
| 5,411,272 | 5/1995 | Naka et al. | 395/137 X |

FOREIGN PATENT DOCUMENTS

| | | |
|---|---|---|
| 0309373 | 3/1989 | European Pat. Off. |
| 0597316 | 5/1994 | European Pat. Off. |

*Primary Examiner*—Almis R. Jankus
*Attorney, Agent, or Firm*—Duane, Morris & Heckscher LLP

[57] ABSTRACT

One or more streams of signals (e.g., audio/video sequences) are associated with the different possible processing paths of processing intersections of an interactive computer application. For example, in a computer-based video game, the flow of processing may approach an intersection where the user may select any one of a number of different paths, each path being associated with a different audio/video sequence corresponding to that path. As the flow of the application progresses towards the intersection, the different audio/video sequences associated with the different paths of that intersection are preprocessed. Preprocessing may include preloading the audio/video sequences and optionally partially decompressing the audio/video sequences. When the flow of the application reaches the intersection, one of the possible paths is selected based on the actions taken by the user. The application causes the audio/video sequence associated with the selected path to be played and the other sequences to be dropped. In this way, the interactive application is provided with smooth transitions at processing intersections. The invention avoids the delays that would otherwise result at a processing intersection from opening the audio/video file associated with the selected path and beginning to decompress the compressed signals contained in that file.

27 Claims, 9 Drawing Sheets

IMPLEMENTING BRANCHING OPERATIONS AT PROCESSING INTERSECTIONS IN INTERACTIVE APPLICATIONS

CROSS-REFERENCES TO RELATED APPLICATIONS

This is a continuation of copending application Ser. No. 08/388,699 ("the '699 application"), filed on Feb. 15, 1995 now U.S. Pat. No. 5,646,866, which is incorporated herein by reference in its entirety.

BACKGROUND OF THE INVENTION

1. Field of the Invention

The present invention relates to computers, and, in particular, to systems for processing graphics and video data for display.

2. Description of the Related Art

Many computer games run on special purpose hardware. Other computer games are designed to run on general-purpose processors under commercially available operating systems. For example, certain computer games are designed to run on an Intel® processor under a Microsoft® Windows™ (MSW) operating system. In the past, designers of computer games have had to design their own software engines to interface with the computer's operating system and/or hardware. As a result, software engines typically differ from computer game to computer game, even between computer games developed by the same designers.

What is needed is a generic software engine for computer games running, for example, on an Intel® processor under a MSW operating system. If such a generic video-game software engine existed, then designers of computer games would be able to design their computer games to run on top of the generic software engine, thereby avoiding the cost and time in having to generate their own specific software engines.

It is an object of the present invention, therefore, to provide a generic software engine for computer games.

It is a particular object of the present invention to provide a generic software engine for computer games that run on an Intel® processor under a MSW operating system.

Further objects and advantages of this invention will become apparent from the detailed description of a preferred embodiment which follows.

SUMMARY OF THE INVENTION

The present invention comprises a computer system, a computer-implemented process, and a storage medium encoded with machine-readable computer program code for handling branching operations during an interactive application. According to one embodiment, a computer identifies a possible processing intersection during real-time implementation of the interactive application, wherein the processing intersection corresponds to two or more possible processing paths and each processing path is associated with one or more streams of signals. The computer preprocesses each stream of signals of the processing intersection during real-time implementation of the interactive application before reaching the processing intersection. The computer selects one of the processing paths upon reaching the processing intersection in response to flow of the interactive application, and the computer further processes the one or more streams of signals associated with the selected processing path.

BRIEF DESCRIPTION OF THE DRAWINGS

Other objects, features, and advantages of the present invention will become more fully apparent from the following detailed description of the preferred embodiment, the appended claims, and the accompanying drawings in which:

DESCRIPTION OF THE PREFERRED EMBODIMENT(S)

The present invention relates to a software infrastructure that can be used by developers of software applications, such as computer game applications, to be run on computer systems, such as those running under a Microsoft® Windows™ (MSW) operating system on an Intel® Pentium™ processor. In general, the software infrastructure has a display subsystem that is designed to support applications that display one or more different types of data to a computer monitor. In addition, the software infrastructure provides for the inclusion of input/output (I/O), audio, communications, and/or capture subsystems to support I/O, audio, communications, and/or capture functions for the applications, respectively.

The displays for typical computer games may, for example, comprise one or more moving objects (called "sprites") overlaid on a fixed or relatively slowly moving background. The movements of the background and some of the sprites may be under the complete control of the computer game application, while the movements of other sprites may be affected by the player of the computer game (i.e., the human user of the computer system). For example, in the computer game Pac-Man, the player may use a joystick to control the movements of the Pac-Man sprite through a maze (i.e., a fixed background). At the same time, the Pac-Man sprite is chased by ghost sprites that are controlled by the Pac-Man application.

The displays for computer games (e.g., the images displayed in a window of a computer monitor) may be constructed from different bitmaps that represent the different pieces of the display. For example, a single graphics bitmap may represent a background scene for a computer game. Other graphics bitmaps may represent the different sprites that are to be overlaid on the background, wherein these other graphics bitmaps may be smaller than the background bitmap. A particular computer game display may be constructed by writing the bitmap pixels for the different pieces to a buffer, where the order in which the different bitmaps are written to the buffer dictates how the different pieces overlay one another in the display. Thus, to show Pac-Man in a maze, the maze bitmap is written to the buffer before the Pac-Man bitmap is written to the buffer.

The software infrastructure of the present invention supports the creation and manipulation of the pieces used in generating displays for a monitor. The infrastructure defines standard interfaces for a programmer to use to write software applications and other software libraries designed to provide computer operations, such as the playing of a computer game, that rely on the functionality of the infrastructure.

Hardware Architecture

Figure 1:
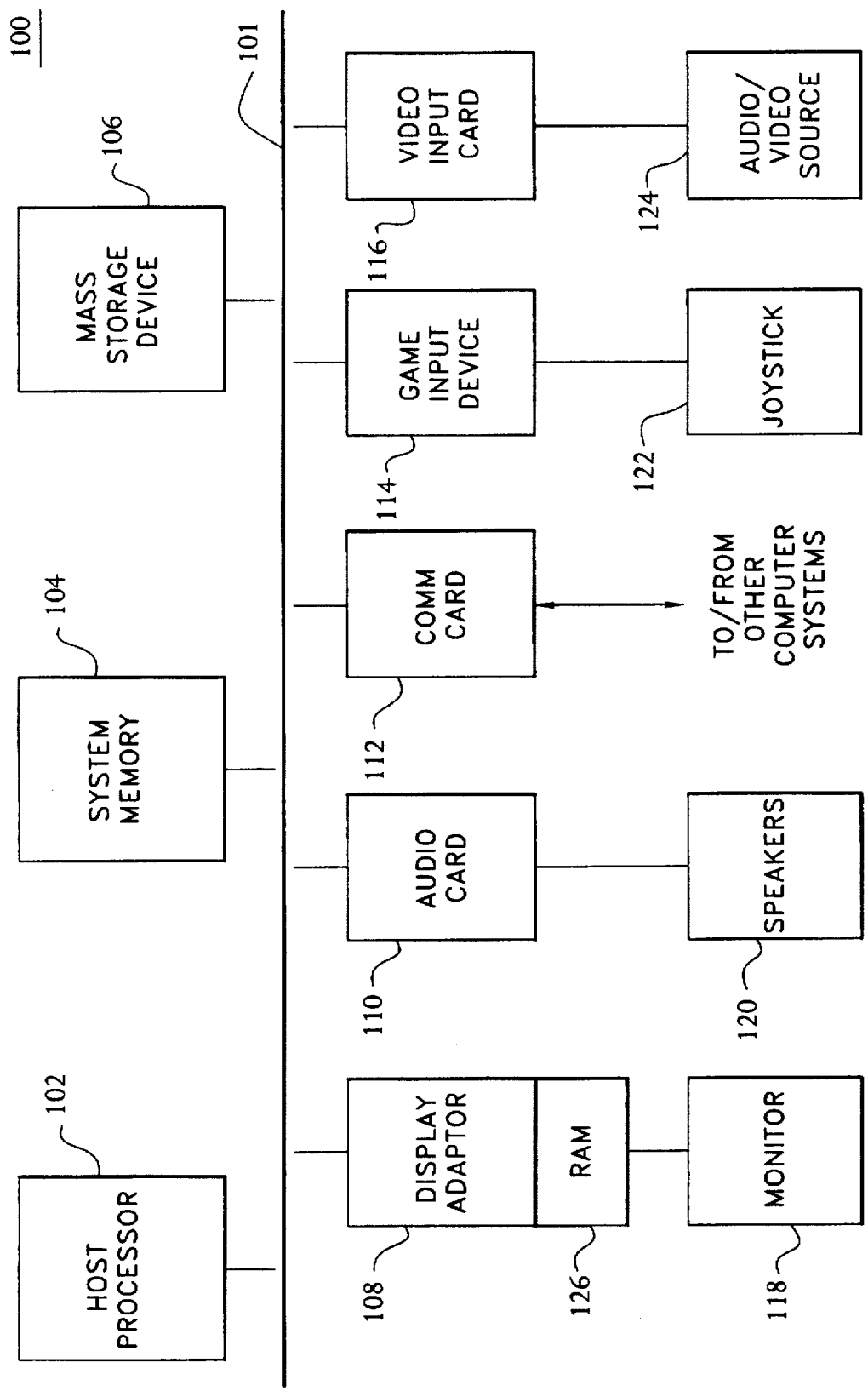
FIG. 1 is a block diagram of the system-level hardware architecture of a computer system, according to a preferred embodiment of the present invention.

Referring now to FIG. 1, there is shown a block diagram of the system-level hardware architecture of computer system 100, according to a preferred embodiment of the present invention. Computer system 100 provides the hardware that supports the implementation of computer games that run on top of the video-game software engines of the present invention.

Connected to system bus 101 of computer system 100 are host processor 102, system memory 104, mass storage device 106, and display adaptor 108. In addition, one or more of the following may be connected to system bus 101: audio card 110, communications (comm) card 112, game input device 114, and video input card 116.

Mass storage device 106 stores files containing sequences of video and graphics images and sequences of audio signals for the computer games. Sequences of audio/video frames may also be received by video input card 116 from audio/video source 124. Game input device 114 receives signals that are generated by joystick 122, which is manipulated by the computer game player. Host processor 102 accesses files from mass storage device 106 and receives signals from game input device 114 and video input card 116. Host processor 102 uses these files and signals to generate the display and audio portions of the computer game. Host processor 102 transmits display signals to random access memory (RAM) 126 of display adaptor 108. Display adapter 108 processes the display signals for display on monitor 118. Similarly, audio card 110 receives audio signals from host processor 102 and processes the audio signals for play on speakers 120.

Bus 101 may be any suitable system bus, such as an industry standard architecture (ISA) or extended ISA (EISA) bus, and is preferably a Peripheral Component Interconnect (PCI) bus. Host processor 102 may be any suitable general purpose processor and is preferably an Intel® Pentium™ processor. System memory 104 may be any suitable standard system memory device. Mass storage device 106 may be any suitable device for storing data and is preferably a hard drive or a compact disk (CD) read-only memory (ROM).

Display adaptor 108 may be any suitable device for driving a display monitor and is preferably a device for driving a super video graphics array (VGA) monitor. RAM 126 may be any suitable memory device and is preferably a dynamic RAM (DRAM) or a video RAM (VRAM). Audio card may be any suitable device for driving speakers of a type suitable for a PC environment. Comm card 112 may be any suitable device for communicating with other computer systems, such as a modem card or a local area network (LAN) card, over a network.

Game input device 114 may be any suitable device for providing the player with an interface to computer system 100 and is preferably a Sega® joystick. Those skilled in the art will understand that player-interface devices other than a joystick may be used, such as a steering wheel and pedals, an airplane yoke, a golf club, or a virtual reality glove. It will also be understood that the computer keyboard may function as the player-interface device.

Video input card 116 may be any suitable device for capturing audio/video signals from an audio/video source and is preferably an Intel® SmartVideo Recorder™ card. Audio/video source 124 may be any suitable source of audio/video signals, such as a video camera, a VCR, an antenna, or a video cable.

Software Architecture

Figure 2:
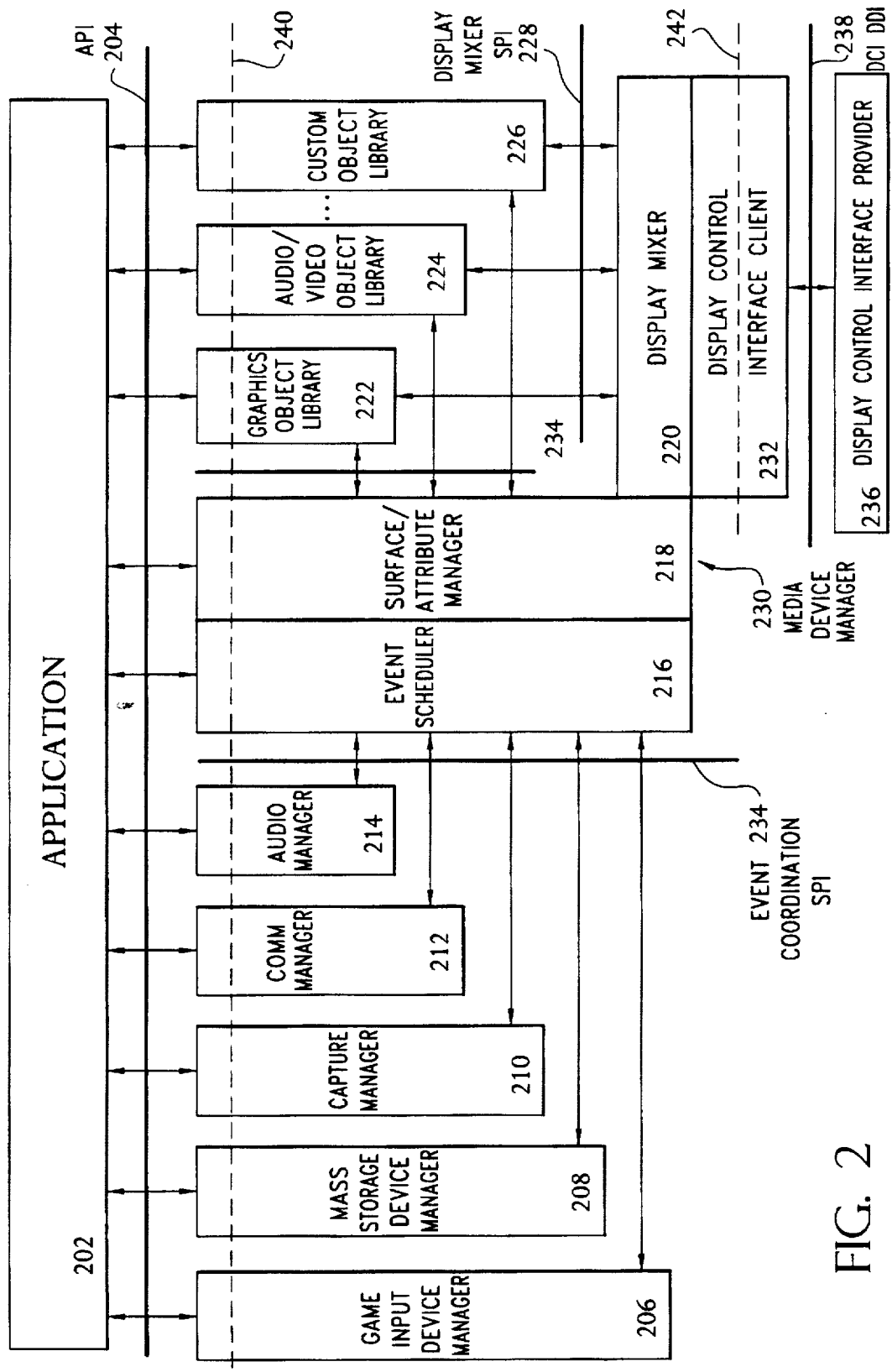
FIG. 2 is a block diagram of the system-level architecture for the software running on the host processor of the computer system of FIG. 1.

Referring now to FIG. 2, there is shown a block diagram of the system-level architecture for the software running on host processor 102 of computer system 100 of FIG. 1. The software system comprises application 202, media device manager 230, and one or more object libraries 222–226. In addition, the software system comprises managers and interfaces for interfacing between host processor 102 and the other hardware components shown in FIG. 1. For example, component managers 206–214 of FIG. 2 provide interfaces to the game input device 114, the mass storage device 106, the video input card 116, the comm card 112, and the audio card 110 of FIG. 1. Similarly, display control interface (DCI) client 232, DCI device driver interface (DDI) 242, and DCI provider 236 provide an interface between the media device manager 230 of FIG. 2 and the display adaptor 108 of FIG. 1. The DCI client, DCI DDI, and DCI provider are described in co-pending U.S. patent application Ser. No. 08/103,399, filed Aug. 6, 1993, now U.S. Pat. No. 5,552,803, the disclosure of which is incorporated herein by reference.

Media device manager 230 comprises event scheduler 216, surface/attribute manager 218, and display mixer 220. The object libraries may include a graphics object library 222, an audio/video object library 224, and/or one or more additional custom object libraries 226. Media device manager 230 and object libraries 222–226 are dynamic link libraries. The application communicates with the object libraries and the media device manager using application program interface (API) 204. The object libraries communicate with the display mixer using display mixer service provider interface (SPI) 228. In addition, the object libraries 222–226 and component managers 206–214 can also communicate with the event scheduler using event coordination SPI 234. The object libraries 222–226 can also communicate with the surface/attribute manager 218 using API 204.

In a preferred embodiment of the present invention, all portions of software modules above dashed line 240 and all portions of software modules below dashed line 242 are implemented under a non-preemptive MSW operating system, where the MSW operating system is implemented as a task under an Intel® iASPOX™ operating system. All portions of software modules that are both below dashed line 240 and above dashed line 242 are implemented as one or more tasks under the preemptive iASPOX™ operating system. The Intel® iASPOX™ operating system is described in co-pending U.S. patent application Ser. No. 08/323,044, filed Oct. 13, 1994, pending, the disclosure of which is incorporating herein by reference.

For example, in the embodiment of FIG. 2, part of graphics object library 222 is implemented under the MSW operating system and the rest of graphics object library 222 is implemented as part of an iASPOX™ task that is different from the MSW operating system. Similarly, part of the DCI client 232 is implemented under the MSW operating system and the rest of the DCI client 232 is implemented as part of an iASPOX™ task that is different from the MSW operating system. The application 202, on the other hand, is implemented entirely under the MSW operating system, while the display mixer 220 is implemented entirely as part of a separate iASPOX™ task.

A software module that is implemented under a non-preemptive MSW operating system is unable to interrupt any other software module running under that MSW operating system. If all of the software modules of the present invention were implemented under a non-preemptive MSW operating system, then critical operations would not be able to be performed if another module running under that MSW operating system had the attention of the processor. As a result, system performance (e.g., the timely playback of an audio/video file) may be adversely affected.

On the other hand, when the MSW operating system is implemented as an iASPOX™ task, a software module that is implemented as a separate task under the iASPOX™ operating system, is able to interrupt a module running under the MSW operating system. Those skilled in the art will understand that one purpose for the software implementation scheme shown in FIG. 2 is to provide some of the software modules of the computer system of the present invention with the ability to interrupt processes running under a non-preemptive MSW operating system. This interrupt capability may be important in order to ensure satisfactory system performance by preventing MSW modules from preoccupying the processor.

It will also be understood by those skilled in the art that, under alternative embodiments of the present invention, one or more of the modules shown in FIG. 2 as being implemented entirely or partially as a separate iASPOX™ task could be implemented entirely under the MSW operating system. Since there are overhead penalties involved in communications between a module implemented under the MSW operating system and a module implemented as a separate IASPOX™ task, the decision as to how to implement a given software module (i.e., how much of the module to implement under the MSW operating system and how much, if any, to implement as a separate iASPOX™ task) may depend on such factors as (1) the expected frequency of communications between the given module and other modules, and (2) the criticality of the functions implemented by the module (i.e., the importance of being able to interrupt other processing).

Application Program Interface

API 204 of FIG. 2 defines a set of functions called by application 202 to control the operations of media device manager 230, object libraries 222–226, and component managers 206–214. These functions may be broken into the following categories:

Graphics object functions;
Audio/video object functions;
Surface/attribute functions;
Meta-functions;
Scheduling function; and
Component manager functions.

The application uses the component manager functions to control the operations of component managers 206–214. Many of the API functions are defined in further detail in Appendix A of the '699 application.

The media device manager 230 of FIG. 2 provides a mechanism for drawing one or more objects to a destination. Different types of objects are possible, including graphics objects and audio/video objects. Objects are drawn to a destination which may be the display buffer for the computer monitor or a specified memory location. The destination for one or more objects is called a surface. Surfaces may themselves be treated as objects. The media device manager provides functions that manipulate, animate, and group objects as well as their destinations.

A surface is the destination where the objects are rendered (i.e., drawn). A surface may be the actual display buffer or a specified memory location. When a surface is created, its width and height (in pixels) and the pixel format are specified. When the destination for a surface is a specified memory location, a portion of memory is allocated to that surface. An option exists to create a surface with a specified default color. If the default color option is not selected, then the pixels of the surface will contain whatever values were present in the allocated portion of memory when the surface was created.

An object is a set of data that is rendered to the surface. Each object has the following attributes:

| | |
|---|---|
| Size: | The width and height of the object in pixels. |
| Position: | The (x,y) coordinate in pixels of the upper left corner of the object relative to the upper left corner of the surface to which the object is rendered. |
| Draw Order: | A value that indicates when the object is rendered to the surface with respect to other objects. Each surface can be considered to be composed of a number of drawing planes which are rendered to the surface in priority order, back to front. An object's draw order is the number of the plane to which it is drawn. |
| View: | The rectangular region of the object that is actually rendered to the surface. The portion of the object that is rendered to the surface may be limited to any rectangular subset of the object. This provides the capability to window into or to scroll within an object. |
| Visibility: | A boolean value that indicates whether or not to render the object to the surface. This provides the capability to remove an object from a surface while preserving its attributes should the object need to be displayed later. |
| Sequencing/ Current Image: | An object is said to be sequenced if it comprises more than one image, wherein only one image can be rendered during a given draw time. The current image is the image of a sequenced object that is rendered to the surface during the current draw time. |
| Destination: | The location of the surface to which the object is rendered. Destination may be the display buffer or a specified memory location. |

Attributes affect the manner in which the object data is rendered to a surface. Some attributes can be changed after the object is created to change that display manner.

Graphics Objects

The media device manager of FIG. 2 supports different types of graphics objects, including sprites, backgrounds, tiles, and grids.

A sprite is a sequence of one or more two-dimensional bitmaps. The size of a sprite is the width and height in pixels of the bitmaps. The view of a sprite is always equal to its size. As a result, the media device manager cannot window into or scroll within a sprite. When a sprite comprises more than one image, the sprite is sequenced. As a result, the sequence of images within the sprite can be cycled through by altering the current image attribute.

Like a sprite, a background is a sequence of one or more two-dimensional bitmaps. The view attribute of a background can be specified. As a result, the media device manager can window into and scroll within a background.

A tile is also similar to a sprite in that it is a sequence of one or more two-dimensional bitmaps. Like a sprite, a tile's view is always equal to its size, thereby preventing the media device manager from windowing into and scrolling within a tile. A tile's destination is an array entry in a grid and is rendered to the surface only when the grid is rendered. The tile's position is determined by its slot in the grid. A tile does not have a draw order of its own, since it is rendered to a surface only when the grid is rendered. A tile has an additional attribute called the active attribute. The active attribute is a boolean value that indicates whether the tile is rendered when its grid is rendered. This active attribute provides the capability to turn a specific tile on or off in a grid without deleting the tile.

A grid is similar to a background, but the data for a grid is determined by an array (or matrix) of equally sized tiles. The view attribute permits the media device manager to display any rectangular subset of tiles within the grid to window into and scroll within the grid.

As mentioned above, a surface can itself be treated as an object. The data for a surface is determined by all of the objects which have the surface as their destination. The media device manager can display any rectangular subset of a surface to window into and scroll within the surface. A surface cannot be sequenced. The destination for a surface can be another surface.

API Functions

As described above, API 204 defines the following sets of functions:

Graphics object functions;
Audio/video object functions;
Surface/attribute functions;
Meta-functions;
Scheduling functions; and
Component manager functions, including audio functions and communications functions.

Graphics Object Functions

Figure 3:
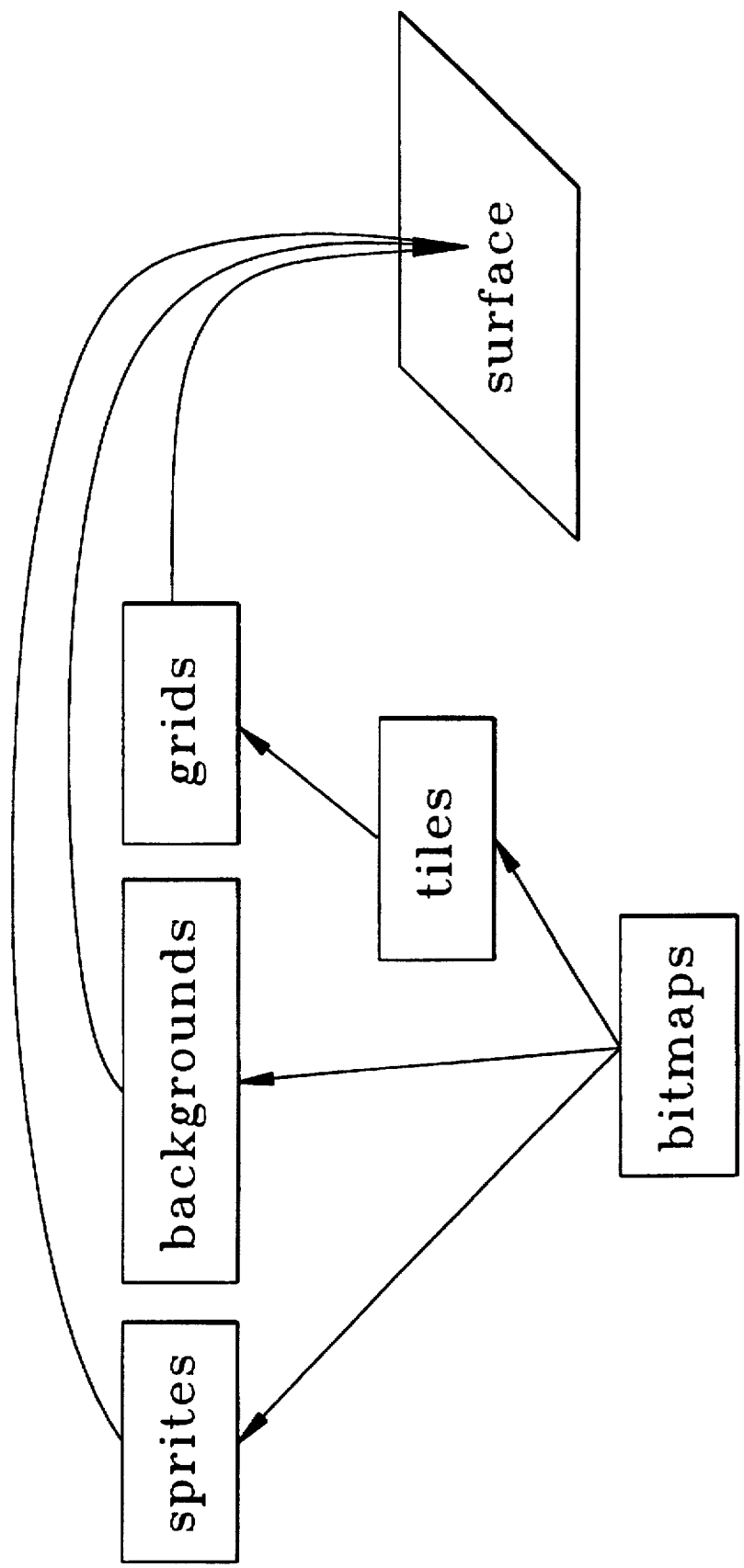
FIG. 3 shows the relationship between bitmaps, graphics objects (i.e., sprites, backgrounds, tiles, and grids), and surfaces.

Referring now to FIG. 3, there is shown the relationship between bitmaps, graphics objects (i.e., sprites, backgrounds, tiles, and grids), and surfaces. Bitmaps, which are themselves undisplayable, are the basic building blocks of graphical data for sprites, backgrounds, and tiles. Tiles are themselves rendered to grids. Sprites, backgrounds, and grids are rendered to surfaces. A surface that is rendered in turn to another surface is called a virtual surface. A surface may be the display buffer or another specified location in memory. The graphics object functions are exported by the graphics object library 222 of FIG. 2.

Bitmap Functions

API 204 of FIG. 2 provides the following bitmap functions:

EACreateBitmap
EADeleteBitmap
EALoadBitmap
EASetBitmapBits
EAGetBitmapBits
EAGetBitmapPointer
EASetBitmapTransparency
EAGetBitmapTransparency The EACreateBitmap function creates a bitmap. Parameters passed to the function call include width, height, and pixel format. A combination of three parameters are used to specify pixel format: color type, bit count, and a mask array. Color types include, for example, color formats based on RGB components and YUV components. Bit count specifies the bit depth of the pixel. For example, a bit depth of 8 specifies eight bits per pixel and is the common reference for palette-based RGB8 data. In some RGB formats, the bit depth is not sufficient to completely specify the format. A mask array is provided to specify the bit mask for each of the R, G, and B colors.

The EADeleteBitmap function deletes a specified bitmap. A bitmap created by calling the EACreateBitmap function does not yet have any data in it. The EALoadBitmap function loads data from a file into a bitmap. Alternatively, the EASetBitmapBits function transfers data from a memory location into a bitmap.

The EAGetBitmapBits function retrieves data from a specified bitmap into a specified destination. The EAGetBitmapPointer function retrieves the selector and offset corresponding to a specified bitmap.

An bitmap object comprises one or more rectangular pixel regions, but not all the data in the regions need be valid. An application can specify that invalid data not be written to the monitor by using a transparency notation. Transparency can be specified using the EASetBitmapTransparency function. Computer system 100 allows for a variety of transparency formats: palette key, color key, or transparency bitmask. Palette key is used when a specific palette index that indicates transparency is embedded in the original object data. Color key is used when true color is used instead of palette-based data. A transparency bitmask is used when transparency data is to be specified in an independent bitmap. This bitmap must be of the same size as the original object bitmap. Transparency styles are defined as follows:

| | |
|---|---|
| EATS_PALETTE_KEY | Color index in the range of 0 to 255. |
| EATS_COLOR_KEY | Color value. |
| EATS_BITMAP | Handle to a bitmap. |
| EATS_NONE | Bitmap has no transparency value. |

The EAGetBitmapTransparency function returns transparency information for a specified bitmap object.

Sprite Functions

API 204 of FIG. 2 provides the following sprite functions:

EACreateSprite
EACreateSequencedSprite
EADeleteSprite
EASetSpriteData
EAGetSpriteData
EASetSequencedSpriteData
EAGetSequencedSpriteData The EACreateSprite function creates a sprite. The function call returns a handle to the sprite object. When a sprite is created, no data is associated with it. The EASetSpriteData function allows data from a bitmap to be associated with a sprite. The bitmap must be created by the EASetSpriteData function is called.

A sprite can be associated with a set of bitmaps with only one being visible at any given time. If the series of bitmaps is cycled through one by one over a periodic interval, the illusion of motion can be created. Associating a sprite with several bitmaps is termed sequencing a sprite. The EACreateSequencedSprite function creates a sequenced sprite. The application specifies the number of bitmaps that are part of the sequence. The data associated with each image in the sequence can be set by using the EASetSequencedSpriteData function.

Figure 4:
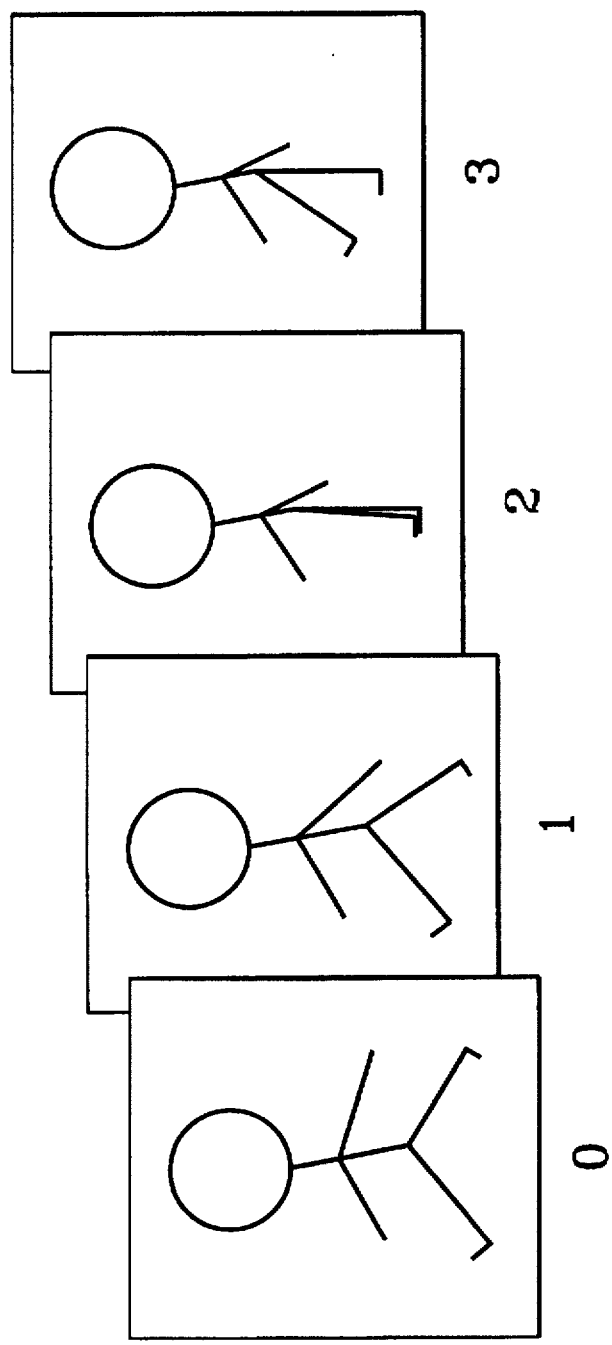
FIG. 4 shows an example of a sequenced sprite associated with four bitmaps.

Referring now to FIG. 4, there is shown an example of a sequenced sprite associated with four bitmaps. By cycling the sprite data through each of the four bitmaps over a periodic interval, the notion of the stick figure walking can be conveyed.

The EAGetSpriteData function retrieves the data set for a specified sprite. The EAGetSequencedSpriteData function retrieves the data set for a specified sequenced sprite.

The EADeleteSprite function deletes a specified sprite.

Background Functions

API 204 of FIG. 2 provides the following background functions:

EACreateBackground
EACreateSequencedBackground
EADeleteBackground
EASetBackgroundData
EASetSequencedBackgroundData
EAGetBackgroundData
EAGetSequencedBackgroundData A background is like a sprite except that a background can have a view. A view allows an application to display only a portion of a larger object. Moving the view around permits scrolling of the object.

A background is created using the EACreateBackground function. This function call returns a handle to the background. A background has no data associated with it when it is created. Data may be associated with a background by using the EASetBackgroundData function. This call associates a bitmap with a background. The application must therefore create the bitmap prior to calling the EASetBackgroundData function.

Like sprites, backgrounds may be sequenced. A sequenced background is created with the EACreateSequencedBackground function. The application specifies the number of bitmaps that are part of the sequence. The data associated with each image in the sequence can be set by using the EASetSequencedBackgroundData function.

Figure 5:
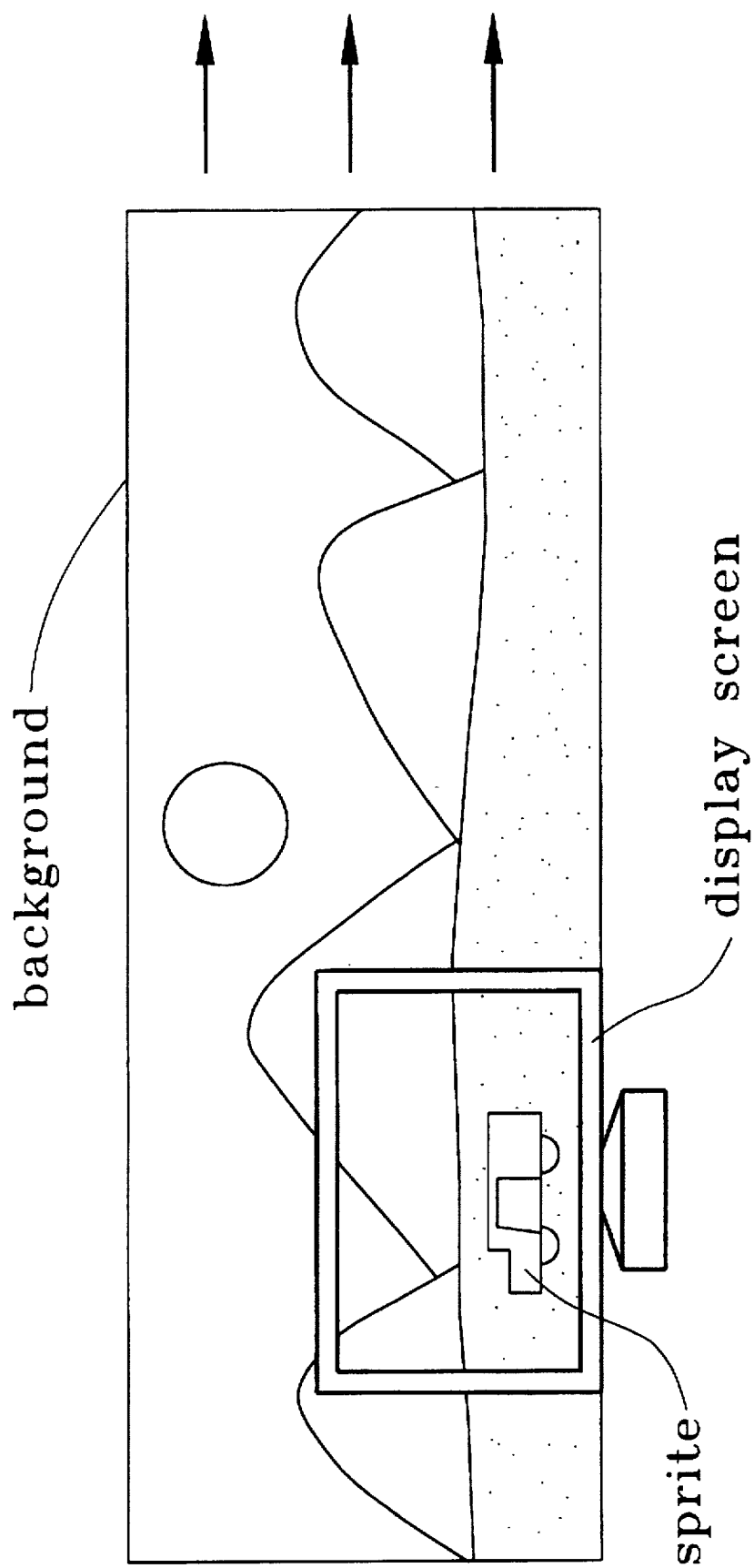
FIG. 5 shows an example that illustrates the use of a view within a background to convey a moving truck.

Referring now to FIG. 5, there is shown an example that illustrates the use of a view within a background to convey a moving truck. The truck, which is a sprite, is stationary. By scrolling the background to the right and having only a portion of it visible on the display monitor at a given time (i.e., by changing the view within the background), the illusion of the truck travelling to the left is created.

The EADeleteBackground function deletes a specified background.

The EAGetBackgroundData function retrieves the data set for a specified background. The EAGetSequencedBackgroundData function retrieves the data set for a specified sequenced background.

Tile and Grid Functions

API 204 of FIG. 2 provides the following tile and grid functions:
EACreateTile
EACreateSequencedTile
EADeleteTile
EASetTileData
EASetSequencedTileData
EAGetTileData
EAGetSequencedTileData
EASetActiveState
EAGetActiveState
EACreateGrid
EADeleteGrid
EASetGridData
EAGetGridData
EAClearGridData
EACreateFlatGrid
EADeleteFlatGrid
EASetFlatGridData
EAGetFlatGridData
EAClearFlatGridData
EACreateFixedGrid
EADeleteFixedGrid
EASetFixedGridData
EAGetFixedGridData
EAClearFixedGridData A grid is a two-dimensional matrix of equally sized tiles. A tile itself is a graphics object which supplies data to grids. A single tile may be used in many locations within a grid. This capability allows for pattern replication.

A tile is created using the EACreateTile function. This function call returns a handle to the tile. When a tile is created, it has no data associated with it. Data may be associated with a tile using the EASetTileData function. This function call associates a bitmap with a specified tile. The application must create the bitmap prior to calling the EASetTileData function.

A grid is created using the EACreateGrid function. This function call returns a handle to the grid. The application specifies the size of the matrix when creating the grid. The application also specifies the size of the tiles within the grid. Tiles in a grid are set using the EASetGridData function. The size of the tiles must match the size specified during the EACreateGrid function call.

Like sprites and backgrounds, tiles within a grid may be sequenced. Sequencing of tiles permits a replicated pattern to be sequenced by changing the underlying tile itself. For example, to provide the image of a field of grass waving in the breeze, a grid with many locations can be created and all locations can be made to point to the same grass tile. Sequencing this tile effectively sequences the entire field of grass. The EACreateSequencedTile and EASetSequencedTileData functions create and initialize sequenced tiles, respectively.

A tile can be made active or inactive using the EASetActiveState function. This function controls the visibility of a replicated pattern within a grid by merely activating or deactivating the underlying tile itself.

The EADeleteTile function deletes a specified tile. The EADeleteGrid function deletes a specified grid. The EAClearGridData function clears the tile at location loc in the grid.

The EAGetTileData function retrieves the data set for a specified tile. The EAGetSequencedTileData function retrieves the data set of a specified sequenced tile. The EAGetActiveState function retrieve the state of the active attribute of a specified tile. The EAGetGridData function retrieves the tile that was previously set for a specific location on a grid.

Figure 6:
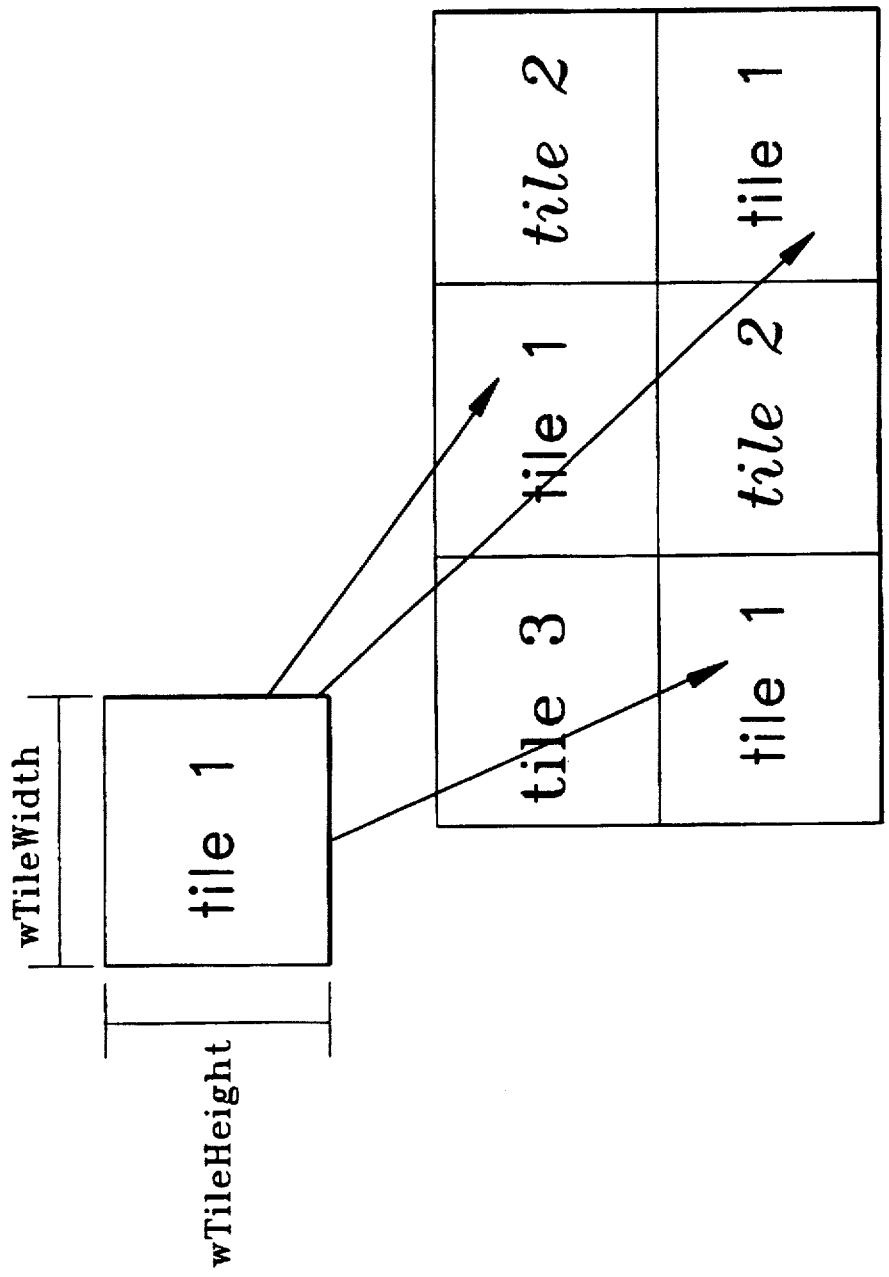
FIG. 6 shows an example of a grid consisting of a (2×3) array of six tiles.

Referring now to FIG. 6, there is shown an example of a grid consisting of a (2×3) array of six tiles, where each grid location has width wTileWidth and height wTileHeight. In FIG. 6, tile 1 is replicated in grid locations (0,1), (1,0), and (1,2), and tile 2 is replicated in grid locations (0,2) and (1,1).

In addition to the type of grid described above (i.e., the regular type of grid), there is a special type of grid called a flat grid. For a regular type of grid, each tile in the grid is stored to memory with its own selector. For a flat grid, all of the tiles are stored in one large region of memory accessed with a single common selector. When drawing a flat grid, only one selector is loaded for the entire grid. Since changing selectors would increase the processing time, flat grids provide more efficient processing during the draw operation. Using a flat grid requires the object library to perform the memory management for the flat grid's data.

A flat grid is created using the EACreateFlatGrid function. This function call returns a handle to the flat grid. The application specifies the size of the matrix when creating the flat grid. The application also specifies the size of the tiles within the flat grid. Tiles in a flat grid are set using the EASetFlatGridData function. The size of the tiles must match the size specified during the EACreateFlatGrid function call.

The EAGetFlatGridData function retrieves the tile that was set for a specific location on a flat grid via a previous EASetFlatGridData call. The EADeleteFlatGrid function deletes a specified flat grid. The EAClearFlatGridData function clears the tile in the flat grid at location loc.

A fixed grid is a grid in which each tile has a fixed size of (8×8) pixels. The EACreateFixedGrid function creates a grid with locations fixed at 8 pixels wide by 8 pixels high. The EADeleteFixedGrid function deletes a previously created fixed grid object. The EASetFixedGridData function sets a tile at a particular fixed grid location. The EAGetFixedGridData function retrieves the tile that was set for a specific location on a fixed grid via a previous EASetFixedGridData call. The EAClearFixedGridData function clears the tile in the fixed grid location.

Audio/Video Object Functions

The source of audio/video data for computer system 100 may be a file stored on mass storage device 106 of FIG. 1, which may be, for example, a CD-ROM or a hard disk. Alternatively, the source for audio/video data may be a continuous audio/video stream. A continuous audio/video stream may correspond to audio/video signals received by comm card 112 over a network from a remote node. Alternatively, a continuous audio/video stream may correspond to audio/video signals received by video input card 116 from audio/video source 124, which may be, for example, a video camera, VCR, television antenna, or video cable. When application 202 of FIG. 2 wants to access audio/video data, it calls the appropriate function into audio/video object library 224, which returns a handle to the source of the audio/video data back to the application.

In a preferred embodiment, audio/video object library 224 supports the decompression and playback of data from Microsoft® Audio Video Interleaved (AVI) files and Microsoft® WAV™ files. An AVI file can contain many data streams, but typically contains only two: one for audio and one for video. A WAV file contains a single audio stream.

An audio stream is a sequence of audio samples, each of which is a unit of audio data. The size of the unit is determined by the audio stream. An audio clip is a contiguous sequence of two or more audio samples. A video stream is a sequence of frames, each of which can be thought of as a single snapshot, like a frame of a movie film. A video clip is a contiguous sequence of two or more video frames. In this specification, the term "sample" may refer to video data and/or audio data, depending on the context. The term "audio/video clip" may refer to an audio clip and/or a video clip, depending on the context.

The media device manager 230 of FIG. 2 treats audio/video clips as sequenced objects, where each audio/video frame is an image of the sequenced object. The option exists to identify and specify individual samples of an audio/video clip by sequence number (i.e., the number of the frame in the clip) or by time (i.e., relative to the beginning of the clip).

When the audio/video source is a Microsoft® AVI file, the AVI file header indicates whether the video data in the file is compressed, and, if so, indicates the compression algorithm used. Using this file header information, the audio/video object library 224 causes the appropriate video codes to be loaded. The AVI file may also contain audio data that may be processed using an audio codec.

To play an audio/video clip, an application 202 first creates an audio/video object and then loads the file containing the clip. To load the file, the audio/video object library 224 (1) reads the file header, (2) loads the proper codec, if needed (i.e., if the clip is compressed), and (3) creates buffers for holding compressed and decompressed data, if needed.

Like a graphics object, an audio/video object is created by the display mixer 220 and contains both generic bytes and object-specific bytes. The generic bytes define the audio/video object as a generic object and allow the audio/video object to inherit all generic object features. The object-specific bytes define the special characteristics of an audio/video object. Together, both sets of bytes allow the audio/video object to be manipulated by the API functions.

Because an audio/video object is a generic function, an application 202 can use certain generic object functions on it. For example, an application can place an audio/video object on a surface with other objects (of any type), group an audio/video object with other objects (of any type), and treat an audio/video object as a sequenced object. An application can also use the time, scheduling, and repeat functions of the event scheduler 216 on an audio/video object.

An application 202 can also apply audio/video functions to an audio/video object. For this purpose, the audio/video object library 224 associates the following information with an audio/video object:

| | |
|---|---|
| Buffer pointers | Pointers to compressed-data and decompressed-data buffers. |
| Audio/video pointers | Pointers to the audio/video file and clip. |
| Samples in clip | Total number (N) of samples in the audio/video clip; samples are numbered from 1 to N. |
| Current sample index | Number, from 1 to N, of the sample currently being display (video) or played (audio). The sample index is 1, if no samples have been displayed or played. |
| Timebase | User-definable variable that defines whether the offset used in seek operations represents samples or milliseconds. The default is milliseconds. |

The compressed video data are read from the file and passed to the video codec for decompression. At draw time, the display mixer 220 calls the draw function in the audio/video object library 224 to instruct the audio/video object library to draw the current video data to the surface. The audio/video object library may accept either a time or a sequence number to determine what video data to render to the surface. Effects can be applied to the video data similar to those applied to graphics objects, including notions of transparency.

The media device manager 230 may schedule decompression and drawing at staggered times. In this case, the codec decompresses and writes the decompressed video data into an intermediate buffer. At draw time, the audio/video object library will copy the decompressed video data onto the draw surface (whether the draw surface is the display buffer or a specified memory location). In other situations, the media device manager may ask for decompression and drawing at the same time. In this case, the codes decompresses and writes the decompressed video data directly onto the draw surface (again, either the display buffer or a memory location).

API 204 of FIG. 2 provides functions to create and manipulate audio/video objects. These audio/video functions may be broken into three categories: general audio/video functions, audio/video control functions, and nonlinear audio/video functions. The audio/video object functions are exported by the audio/video object library 224 of FIG. 2. Audio/video object library 224 supports the following audio/video operations:

Video scaling;
Video color conversion;
Video clipping;
Mixing video with other display streams, including video on graphics and video on video;
Mixing multiple audio streams with other display streams, including audio with audio, video, and/or graphics;

Preloading multiple audio and video clips and using branch tables to "vector" (i.e., transition) to the needed clip immediately;

Treating audio and video clips as sequenced objects; and

Supporting installable codecs, including control mechanisms that automatically handle backup, degradation, etc.; transparency; and the codec interface defined by the flat memory model used by Microsoft® Windows 95™ and Windows NT™ operating systems.

General Audio/Video Functions

API 204 of FIG. 2 provides the following general audio/video functions:

EAAVCreateObject
EAAVLoadFile
EAAVDeleteObject
EAAVPlay
EAAVPause
EAAVResume
EAAVStop To prepare for playback, two functions are called: EAAVCreateObject and EAAVLoadFile. The EAAVCreateObject function creates an audio/video object and returns a handle to it. The EAAVLoadFile function opens an audio/video file, reads the file's main and stream headers, and uses the information from the headers to set various attributes, both generic and specific, in the audio/video object created by EAAVCreateObject. EAAVCreateObject and EAAVLoadFile do not load any samples into the compressed-data buffer or decompress the data into the decompressed-data buffer.

The EAAVDeleteObject function deletes an audio/video object, closes its file, and releases the resources allocated to it. These resources include the memory used for the object itself, for the buffers, and for the codec.

The EAAVPlay function plays an audio/video clip from a caller-defined start position to a caller-defined stop position. The start and stop positions are defined in samples or milliseconds, depending on the value of the timebase. If an audio/video clip has not been preloaded, the EAAVPlay function also loads the clip into the compressed-data buffer and decompresses it into the decompressed-data buffer before playback. The call to EAAVPlay returns immediately, but the audio/video clip continues to play as determined by the value of the P_REPEAT parameter. If P_REPEAT is TRUE, then the clip repeats until the application stops it by calling EAAVPause or EAAVStop. If P_REPEAT is FALSE, then the clip plays until it reaches the stop position or the application stops it by calling EAAVPause or EAAVStop. When a video clip is paused (EAAVPause), stopped (EAAVStop), or reaches its stop position, then the most recently displayed frame of the clip continues to be displayed until the EAAVDeleteObject function is called.

When the application calls the EAAVPlay function in the audio/video object library, the audio/video object library may call the appropriate API functions into the event scheduler to instruct the event scheduler to schedule a repeating event whereby the frames in the audio/video clip are decoded at a specified rate. At draw time, the display mixer calls the audio/video object library's draw function to render the next video frame to the surface. In this way, the frames of the audio/video clip are decoded and displayed without any calls from the application into the audio/video object library after the initial EAAVPlay call.

The EAAVPause function pauses an audio/video clip. The EAAVStop function stops an audio/video clip. The EAAVResume function resumes playing a paused audio/video clip, but has no effect on a clip that has been stopped (EAAVStop) or has reached its stop position.

Audio/Video Control Functions

API 204 of FIG. 2 provides the following audio/video control functions:

EAAVSetTimebase
EAAVGetTimebase
EAAVSendCodecMessage
EAAVSeek
EAAVSetQuality

The EAAVSetTimebase function sets the audio/video object's timebase to samples or milliseconds. The default is samples. The EAAVGetTimebase function returns whether the audio/video object's timebase is samples or milliseconds.

The EAAVSendCodecMessage function sends a message to the installed video codec. This function may be used by an application 202 of FIG. 2 to control application-specific video codes features that the media device manager 230 and the audio/video object library 224 may be unaware of.

The EAAVSeek function moves the sample pointer for an audio/video clip to the specified sample or time. Using a caller-defined start position and offset, the EAAVSeek function moves forward or backward through an audio/video clip. The start position may be the beginning of the clip, the current sample index, or the end of the clip. The offset value is interpreted in terms of the timebase.

The EAAVSetQuality function sets the video quality.

Non-Linear Audio/Video Functions

API 204 of FIG. 2 provides the following non-linear audio/video functions:

EAAVCreateLoop
EAAVDeleteLoop
EAAVPreload
EAAVFlush
EAAVCreateVectorTable
EAAVDeleteVectorTable
EAAVGetTableEntry
EAAVSetTableEntry
EAAVClearTableEntry
EAAVClearVectorTable
EAAVChooseTableEntry Audio/Video Loops The EAAVCreateLoop function creates a loop in an audio/video clip. An audio/video loop is a sequence of two or more consecutive audio/video samples that is repeated one or more times. An audio/video loop may be placed anywhere within an audio/video clip by specifying the beginning and end positions for the loop (using samples or milliseconds, depending on the setting of timebase). The loop may be repeated a specified number of times or instructed to repeat indefinitely. If the specified repeat count is "infinite", then the loop is repeated until the application calls EAAVDeleteLoop, EAAVPause, or EAAVStop.

If the samples in an audio/video clip are numbered from 1 to N, then the samples in an audio/video loop are numbered from i to j, wherein $1 \leq i < j \leq N$. An audio/video clip can be coincident with the entire loop (i.e., the loop can be numbered from 1 to N, like the clip). An audio/video loop may be nested within another audio/video loop. That is, a loop numbered from k to l may be nested within a loop numbered from i to j, where $i \leq k < l \leq j$.

An audio/video loop is displayed when the clip containing it is displayed. When an audio/video loop stops playing, either because it has reached its endpoint (for non-infinite play) or because the application has deleted it (EAAVDeleteLoop), then the clip containing the loop continues to play until it reaches the stop position specified in the EAAVPlay call or until it is paused (EAAVPause) or stopped (EAAVStop) by the application.

The EAAVDeleteLoop function deletes an audio/video loop.

Preloading Audio/Video Clips

As mentioned earlier in the discussion of EAAVCreateObject and EAAVLoadFile, opening an audio/video clip does not load any of its samples into memory or decompress them. The audio/video object library 224 provides two functions to support preloading of audio/video clips: EAAVPreload and EAAVFlush. These functions can be used to preload samples into the compressed-data buffer, decompress them into the decompressed-data buffer, and flush them from memory.

The EAAVPreload function reads a caller-defined number of audio/video samples into the compressed-data buffer, starting at the current sample index. The EAAVPreload function also manipulates the samples as specified by a set of preload flags. If set, these flags have the following meanings:

| | |
|---|---|
| PL_ENTIRE_FILE | Read the entire audio/video clip from the file and store it in the compressed-data buffer. |
| PL_DECOMPRESS | Decompress the preloaded video frames into the decompressed-data buffer. |
| PL_PERSISTENT | Retain the preloaded audio/video samples in memory after playback (e.g., for subsequent playing). |

After calling EAAVPreload, the clip is ready to play as soon as EAAVPlay is called.

Calling the EAAVPreload function before calling EAAVPlay is not necessary, but doing so may improve performance. In preloading, the audio/video object library causes one or more samples of audio/video data to be read from the file ahead of time (i.e., before the display mixer actually asks for the video data to be drawn) and (possibly) decompressed ahead of time to be ready for subsequent drawing to the surface. When the end of the current audio/video file is approaching, the application may elect to preload audio/video samples from the next audio/video file to provide a smooth transition between files.

The EAAVFlush function flushes any audio/video samples that were kept in memory because EAAVPreload was called with the PL_PERSISTENT flag set.

Preloading With Vector Tables

The previous section of the specification described how to preload individual audio/video clips. This section describes a generalization of that scenario: how to use vector tables for preloading a collection of audio/video clips in support of branching operations.

The media device manager 230 of FIG. 2 supports the use of vector tables. Vector tables provide the capability to preload one or more different sequences of audio/video frames that may correspond to different possible choices for the flow of an interactive video application. A vector table is an array of pointers to data structures. Each entry in a vector table corresponds to a sequence of frames in an audio/video clip. The vector table can be filled with entries corresponding to different sequences of frames from one or more audio/video clips.

Figure 7:
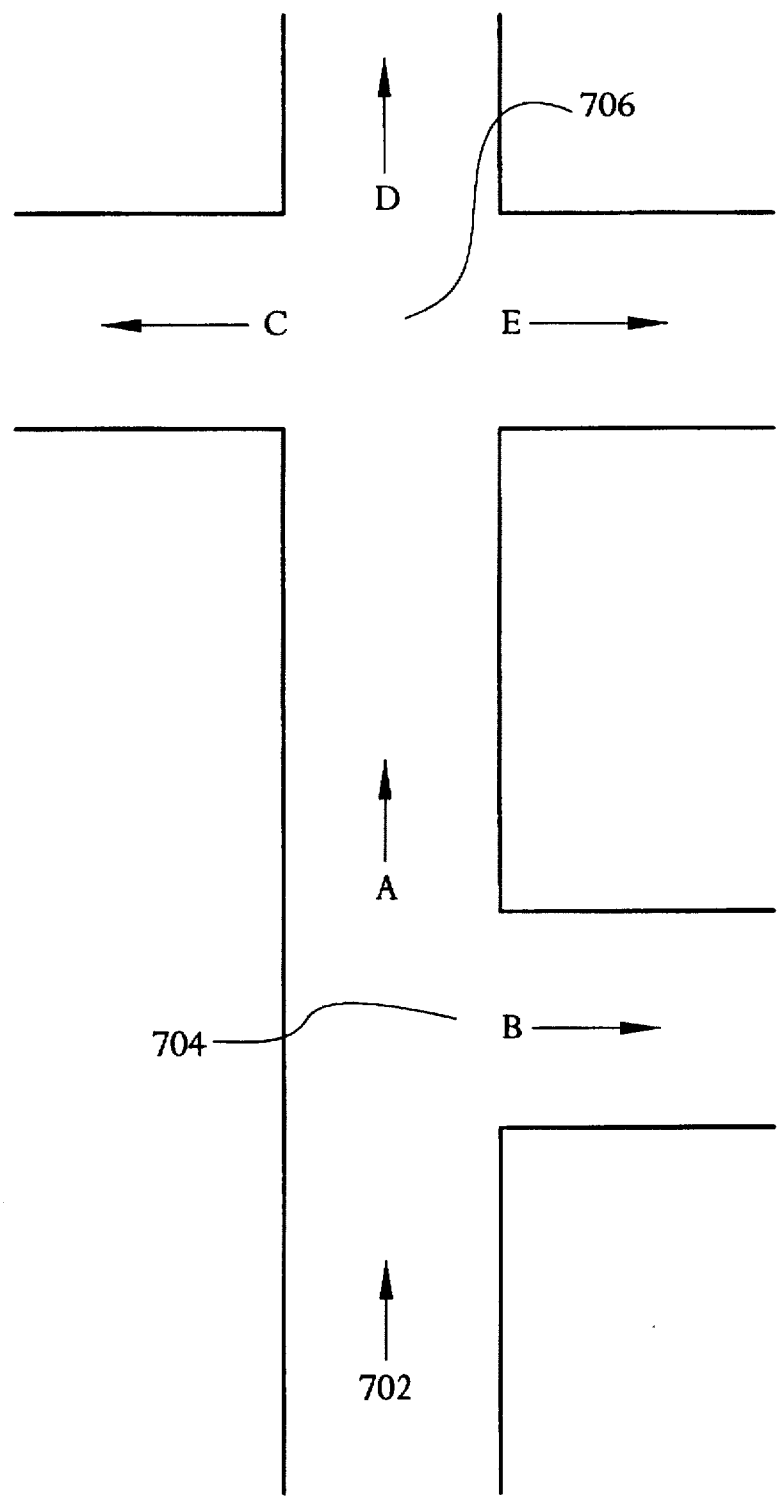
FIG. 7 shows a representation of the flow of an interactive video application for which a vector table may be used.

Referring now to FIG. 7, there is shown a representation of the flow of an interactive video application for which a vector table may be used. The application may simulate, for example, a person walking through a set of intersecting hallways and the application may cause video images to be displayed on the monitor that correspond to the views a person would have at different locations and directions in those hallways. When the user reaches intersection 704 from position 702, he may have the choice of proceeding in either direction A or direction B. Similarly, if direction A is selected, when the user reaches intersection 706, he may have the choice of proceeding in one of direction C, D, or E. If the application waits until after the user makes his choices before beginning to read and decode the corresponding audio/video data from the audio/video file, there may be an undesirable delay in the display of the video images.

In order to provide for smooth transitions at hallway intersections, the application may elect to use vector tables. When the application recognizes that the user is approaching intersection 704 from direction 702, the application instructs the audio/video object library to create a vector table and fill two of its entries with the sequences of audio/video frames corresponding to directions A and B. This causes two sequences of audio/video frames to be preloaded—one for direction A and one for direction B. If, when the user reaches intersection 704, he selects direction A, the application instructs the audio/video object library to play the audio/video sequence corresponding to direction A and optionally flush the audio/video sequence for direction B.

Similarly, when the application recognizes that the user is approaching intersection 706 along direction A, the application instructs the audio/video object library to fill three of the vector table entries with sequences of audio/video frames corresponding to directions C, D, and E. Again, when the user finally reaches intersection 706, audio/video sequences for each of the three options will already be preloaded.

As a result, vector tables are a mechanism for providing smooth transitions when choices are made as to the flow of an interactive video application.

The application calls the EAAVCreateVectorTable function in the audio/video object library to create an empty vector table. The application specifies the maximum number of entries in the vector table and the audio/video object library returns the handle to the newly created vector table. The EAAVDeleteVectorTable function deletes a vector table.

The EAAVSetTableEntry function places a caller-defined audio/video clip and offset in a vector table entry and preloads the clip. The application specifies the handle to the vector table, a table entry number (selected by application), the handle to the audio/video clip to be preloaded, the position within the audio/video clip for the first frame of the table entry, the number of frames to preload, and other preload information.

The EAAVChooseTableEntry function begins playing the audio/video sequence that corresponds to a specified table entry. The application is responsible for saving the vector table handle and for keeping track of the various choices that correspond to the different vector table entries. The application is also responsible for recognizing which vector table entry is to be selected. After a choice made, the application calls EAAVChooseTableEntry to instruct the audio/video object library to play the audio/video clip corresponding to the selected vector table entry. As part of the EAAVChooseTableEntry call, the application indicates whether to flush the other vector table entries and clear the table.

The EAAVGetTableEntry function returns the handle to the audio/video clip associated with a specified vector table entry, and the offset into the audio/video clip corresponding to the first audio/video frame for the vector table entry. The EAAVClearTableEntry function clears an entry from a vector table and flushes the associated clip from memory. The EAAVClearVectorTable function clears an entire vector table and flushes all the associated audio/video clips from memory.

Surface/Attribute Functions

The surface/attribute manager 218 of FIG. 2 exports surface functions and attribute functions of API 204. Surface functions control surfaces to which objects are rendered. Attribute functions manipulate the attributes of objects. Attribute functions are generic functions that may be applied to any type of objects, including graphics objects and audio/video objects.

Surface Functions

API 204 of FIG. 2 provides the following surface functions:
EACreateSurface
EADeleteSurface
EASetSurfaceColor
EAGetSurfaceColor A surface is a destination for objects. A surface itself may be treated as an object. Multiple surfaces can be created. Each surface can have a draw order assigned to it, allowing the surfaces to be combined and displayed in a coherent manner.

Figure 8:
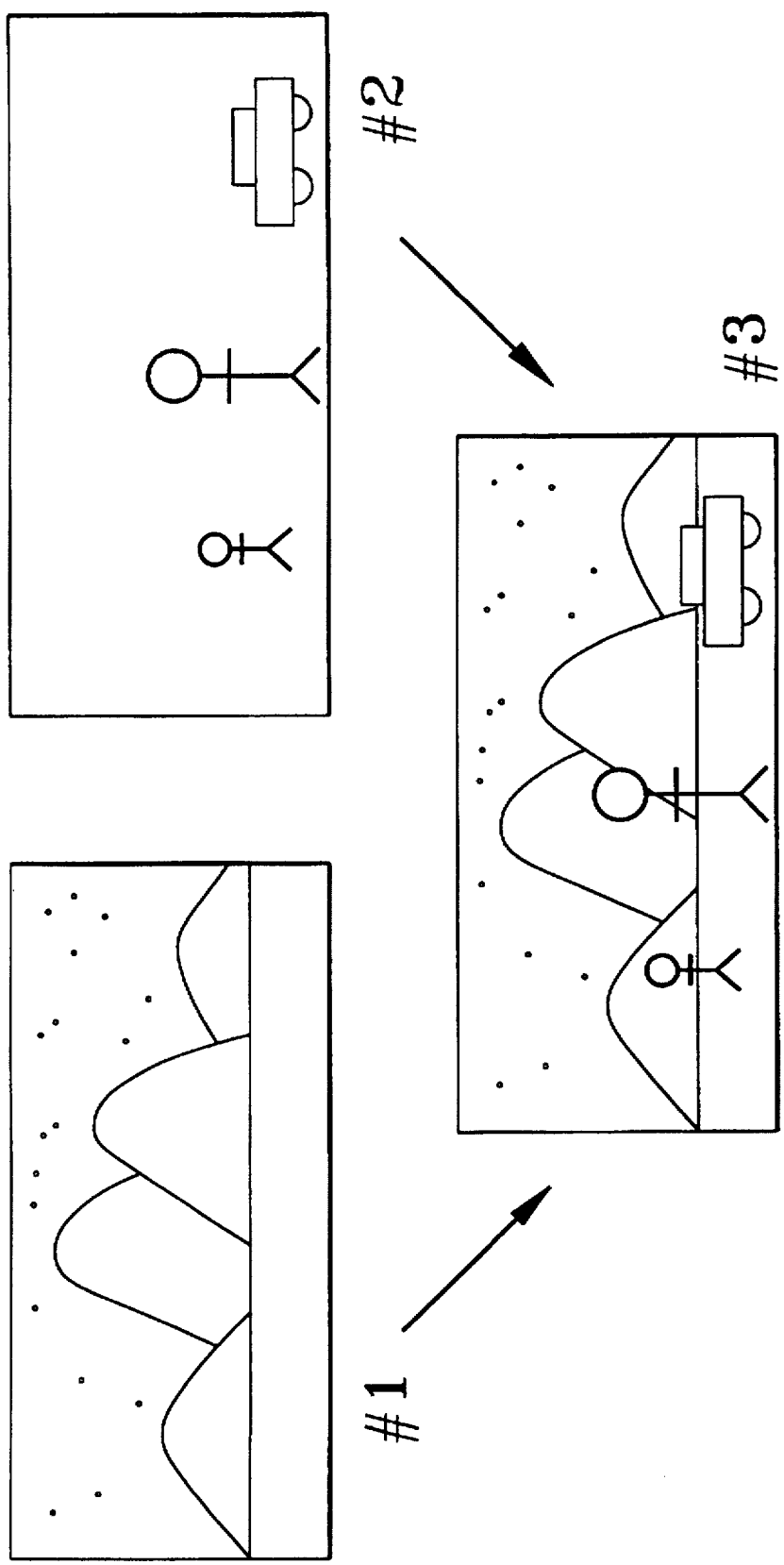
FIG. 8 shows an illustration of how two surfaces are combined onto another surface.

Referring now to FIG. 8, there is shown an illustration of how two surfaces are combined onto another surface. Surface #1 contains two backgrounds: the dark sky with stars and the foreground with mountain ranges. Surface #2 contains two stick-figure sprites and a car sprite. Surfaces #1 and #2 are combined onto surface #3, where the draw order of surface #2 specifies that surface #1 be drawn "behind" surface #2.

Surfaces are created using the EACreateSurface function. The application specifies the width, height, and pixel format of the surface. A default color can be specified for the surface using the EASetSurfaceColor function. In this case, any pixel not occupied by a graphical object will have the default color when the surface is rendered and drawn.

The EAGetSurfaceColor function returns the default color assigned to a specified surface. The EADeleteSurface function deletes a specified surface.

Attribute Functions

API 204 of FIG. 2 provides the following generic functions to manipulate the attributes of objects:
EASetDrawOrder
EAGetDrawOrder
EASetVisibility
EAGetVisibility
EASetPosition
EAGetPosition
EASetView
EAGetView
EASetDestination
EAGetDestination
EASetCurrentImage
EAGetCurrentImage
EAIncCurrentImage
EADecCurrentImage Computer system 100 of FIG. 1 provides a set of attributes for objects. These attributes control how each object is rendered. The EASetDestination function specifies the surface that is to be the destination for an object. The EASetPosition function specifies the location within the surface where the object is rendered. The upper left corner of the surface (i.e., the destination) is the point (0,0). The EASetView function specifies the portion of the object to be rendered. The EASetVisibility function shows or hides the object. An application calls the EASetDrawOrder function to specify the order in which an object is rendered to a specified surface.

The EAGetDestination function retrieves the current destination for a specified object. The EAGetPosition function retrieves the current position for a specified object. The EAGetView function returns the currently selected view for a specified object. The EAGetVisibility function retrieves the display state of a specified object. The EAGetDrawOrder function returns the draw order for a specified object.

The EASetCurrentImage function specifies which image in a sequenced object provides the current data for display. The EAGetCurrentImage function retrieves the index for image whose data was previously set to supply the current image. The EAIncCurrentImage function sets the current image by incrementing the sequence index. The EADecCurrentImage function sets the current image by decrementing the sequence index.

Meta-Functions

An application can manipulate objects in ways other than setting their attributes. These manipulations of objects are performed by use of meta-functions, which include render/draw functions, effect functions, and grouping functions. The meta-functions are exported by the surface/attribute manager 218 of FIG. 2.

Draw Function

API 204 of FIG. 2 provides the following function to draw objects:
EADraw

The EADraw function controls how and when objects and surfaces get drawn to their destinations. The EADraw function copies a specified completed surface to its final destination. Multiple surfaces can be combined to form another surface. Computer system 100 handles rendering of all dependent surfaces when a specified surface is rendered or drawn.

Effect Functions

API 204 of FIG. 2 provides the following effect functions:
EASetEffect
EAClearEffect
EAGetEffectStyles
EAGetEffectStyleParams Effects can be applied to any object that can be displayed (i.e., sprites, backgrounds, grids, tiles, and surfaces). Effects do not change the original object data; they only change the way the object gets rendered. Objects may have more than one effect active at a time. An effect is specified by a bit field. An application can reference only one effect per function call. However, the application can clear multiple effects at a time by bitwise OR'ing the appropriate symbols.

The EASetEffect function applies a specified effect to a specified object. The EAClearEffect function clears one or more effects that were applied to a specified object. The EAGetEffectStyles function returns the effects that are currently enabled for a specified object. The EAGetEffectStyleParams returns the currently set values for the specified effect.

The possible effects include, for example, the following:

| | |
|---|---|
| Scale: | Controls the size of an object. This function can scale up or down based on the size of the source rectangle specified when the object was created and the parameter in this function. |
| Rotate: | Rotates an object around a specified point a specified number of degrees. |
| Flip: | Flips an object left to right (xFlip) and/or top to bottom (yFlip). |
| Horizontal shear: | Horizontally shifts, row by row, an object left (negative values) or right (positive values). Each value in the pTransArray corresponds to one row starting at the top of the object. |

| | |
|---|---|
| Vertical shear: | Vertically shifts, column by column, an object up (negative values) or down (positive values). Each value in the pTransArray corresponds to one column starting at the left of the object. |
| App function: | Applies an application function that gets passed in the pAppFn parameter to an object. |

Each effect requires a unique set of parameters which are passed using a structure. The parameters for each effect are as follows:

| Effect | Structure Name | Elements |
|---|---|---|
| EA_SCALE | EA_SCALE_STRUCT | RECTL rScale |
| EA_ROTATE | EA_ROTATE_STRUCT | POINT RotationPt, int degrees |
| EA_FLIP | EA_FLIP_STRUCT | BOOL xFlip, BOOL yFlip |
| EA_HORIZ_SHEAR | EA_HORIZ_SHEAR_STRUCT | LPINT pTransArray, WORD numElements |
| EA_VERT_SHEAR | EA_VERT_SHEAR_STRUCT | LPINT pTransArray, WORD numElements |
| EA_APP_FN | EA_APP_FN_STRUCT | FARPROC pAppFn, LPVOID lpContext | where:
rScale is a scale factor;
RotationPt is a point about which to rotate;
degrees is an angle by which to rotate;
xFlip is a flag indicating whether to flip horizontally;
yFlip is a flag indicating whether to flip vertically
pTransArray is a one-dimensional array whose elements indicate how much to move the corresponding row or column;
numElements is the number of elements in pTransArray;
pAppFn is a pointer to the function to be called; and
lpContext is a handle that is provided by the application to provide the call function a mechanism by which it can know when and what module called it.

Grouping Functions

API 204 of FIG. 2 provides the following group functions:
EACreateGroup
EADeleteGroup
EAAddObjectToGroup
EARemoveObjectFromGroup
EAListObjectsInGroup
EAEnumObjectsInGroup
EAGetNumObjectsInGroup
EAGroupSetAttrib
EAGroupAdjustAttrib
EAGroupGetAttrib Grouping can be used when two or more objects are to have the same attribute changed. Any combination of sprites, backgrounds, and grids can be grouped together. A group acts as a command dispatcher, changing a given attribute for all its members. Not all attributes necessarily apply to all objects in a given group. For example, since a sprite's view is fixed, changing the view on a group that contains a sprite does not effect the sprite.

Only one variable of an attribute can be changed at a time. The attributes and their variables that can be changed using the group functions are as follows:

| Attribute | Variable Name (integer) |
|---|---|
| Position | PosX |
| | PosY |
| Draw order | DrawOrder |
| View | ViewTop |
| | ViewRight |
| | ViewWidth |
| | ViewHeight |
| Visibility | Visible |
| Current Image | FrameIndex |
| Rate | UpdateRate |

The EACreateGroup function creates a group and returns the handle for the group. The EADeleteGroup function deletes a specified group. The EAAddObjectToGroup function adds a specified objects to a specified group. The EARemoveObjectFromGroup function removes a specified object from a specified group. The EAListObjectsInGroup function returns a list of all of the objects that are members of a specified group. The EAEnumObjectsInGroup function calls an application-supplied callback function for each object that is a member of a specified group. The EAGetNumObjectsInGroup function returns the number of objects that are currently members of a group.

The EAGroupSetAttrib function sets the value of a specified attribute for all members of a specified group. The EAGroupAdjustAttrib function adjusts the value of a specified attribute by a specified delta from the current value for all members of a specified group. The EAGroupGetAttrib function returns the current value of a specified attribute for a specified group.

Scheduling Functions

The scheduling subsystem of computer system 100 supports scheduling functions, which include timer functions, event functions, and conditional functions. The scheduling functions are exported by the event scheduler 216 of FIG. 2.

Timer Functions

API 204 of FIG. 2 provides the following timer functions:
EACreateTimer
EADeleteTimer
EASetTimerFrequency
EAGetTimerFrequency
EAStartTimer
EAResetTimer
EAGetCurrentTimerTick
EASetCurrentTimerTick
EAStopTimer A timer is an object that permits the scheduling and synchronizing of activities. A timer is created using the EACreateTimer function, which returns a handle to the newly created timer. The EADeleteTimer function stops a timer if running and deletes the timer. The EASetTimerFrequency function sets the frequency of a specified timer. The EAGetTimerFrequency function returns the frequency values for a specified timer.

The EAStartTimer function starts a specified timer. The EAResetTimer function resets the timer tick value to zero. If the timer is running, it will continue to run. If the timer is stopped, just the timer tick count will change; the timer will not be started. The EAGetCurrentTimerTick function returns the current tick value for the specified timer. The EASetCurrentTimerTick function sets the current tick value for the specified timer. The EAStopTimer function stops a specified timer, but does not change the timer tick count.

Event Functions

Computer system 100 allows activities called events to be scheduled for later or even repeated execution. API 204 of FIG. 2 provides the following event functions:

EACreateEvent
EADeleteEvent
EAScheduleEvent
EARepeatEvent
EAQueryEventStatus
EAGetEventRepeat
EAUpdateEventRepeat To schedule an activity, an event is first created using the EACreateEvent function. This function call returns a handle to the event. This handle can be used to refer to the event. The EADeleteEvent function deletes a specified event.

Once an event has been created it can be scheduled to occur at a specific time using the EAScheduleEvent function. This function call expects a handle to the event to be scheduled as well as the handle of the timer object to use to schedule the event.

A scheduled event can be made to occur repeatedly using the EARepeatEvent function. This function call is given the time period between repetitions in terms of timer ticks. The EARepeatEvent function can also be given the number of times that the repetition is to occur. If the wTimes parameter is 0, the event will be repeated infinitely until the event is deleted.

The EAQueryEventStatus function provides the current status of a specified event. The EAGetEventRepeat function retrieves the time period for a specified repeated event. The EAUpdateEventRepeat function updates a repeated event with a new period.

Events are identified by an event code. The SET__ATTRIB event can be used to set any generic attribute of an object. The first parameter specifies the object whose attribute must be set. SET__ATTRIB can operate on single as well as groups of objects. The second parameter identifies the attribute to be set. The third parameter is a modifier that can specify that the attribute be set to a RANDOM value or to an ABSOLUTE value. When ABSOLUTE is used as the modifier, the fourth parameter specifies the value to be used.

The ADJUST__ATTRIB event can be used to change any generic attribute of an object. ADJUST__ATTRIB applies an addend to the attribute (i.e., +=operator is applied). The parameters are similar to those for the SET__ATTRIB event.

The SET__EFFECT event causes an event to be created that will set an effect. Its parameters are similar to those of the EASetEffect function call. Once an effect is set, its parameters can be modified by re-issuing the SET__EFFECT event.

The CLEAR__EFFECT event clears a specified event.

The DRAW event allows an event to be created. By calling the EARepeatEvent function on a DRAW event, the frequency with which the monitor display is to be refreshed can be set.

The CALLBACK event creates an event that will invoke a supplied function. By calling the EARepeatEvent function on a CALLBACK event, a periodic timer callback can be set. In addition to specifying the callback function itself, a second DWORD parameter may be provided as a parameter to be passed to the CallbackProc function. This allows the procedure to have a context when it is called.

an object library can define custom events that the event scheduler does not support. The EA__EVENT__USER event allows an object library to export events for its own objects that the event scheduler does not know about.

Conditional Functions

Conditional functions fall into two categories: conditional actions and constrained events.

Conditional Actions

During the course of scheduled activities, several error or notification conditions may arise. Computer system 100 allows a variety of actions to be enabled to respond to such conditions. API 204 of FIG. 2 provides the following conditional action functions:

EASetConditionalAction
EAGetConditionalAction
EAClearCondition
EASetConditionalCallback
EAGetConditionalCallback Conditions and actions are set using the EASetConditionalAction function. Computer system 100 allows for the specification of a callback function to be invoked in response to a condition. (Note that setting a simple periodic callback function may be performed using the EACreateEvent, EAScheduleEvent, and EARepeatEvent functions.) Conditional callbacks are set with the EASetConditionalCallback function.

The EAGetConditionalAction function retrieves the action associated with a specified action. The EAClearCondition function clears an action that was previously specified to occur in response to a specified condition. The EAGetConditionalCallback function retrieves the callback function associated with a specified condition.

Conditions upon which callbacks can be set are: LOSS__OF__FOCUS, RETURN__OF__FOCUS, and FALL__BEHIND. Actions that can be taken when these conditions are met are: PAUSE, IGNORE, and CONTINUE. The LOSS__OF__FOCUS condition occurs when a player has activated an application different from application 202 of FIG. 2. The RETURN__OF__FOCUS condition occurs when a player has returned to application 202. The FALL__BEHIND condition occurs when computer system 100 is overloaded and cannot keep up with the rendering demands. The PAUSE action temporarily stops the event timer for surfaces associated with application 202. The CONTINUE action restarts a previously stopped event timer. The IGNORE action is a null action in which no action is taken.

Constrained Events

In addition to conditional actions, computer system 100 also allows constraining conditions to be imposed on events. For example, constraints can be set on ADJUST__ATTRIB scheduled events. Constraints can also be set to limit the random value generated for either SET__ATTRIB or ADJUST__ATTRIB events. API 204 of FIG. 2 provides the following constrained event functions:

EASetAdjustConstraint
EAGetAdjustConstraint
EAClearConstraint
EASetConstraintCallback
EAGetConstraintCallback Constraints are set with the EASetAdjustConstraint function. A parameter to this function identifies whether the EA__ADJUSTBOUNDS or the EA__RANDOMNESS is to be constrained.

EA__ADJUSTBOUNDS refers to setting bounds on the result of an ADJUST__ATTRIB event. Minimum and maximum bound values are specified as parameters. When the result overflows the specified bounds, either a EA_BOUNCE or a EA_CYCLE operator can be applied to the scheduled event. Applying a EA_BOUNCE operator reverses the sign of the ADJUST_ATTRIB addend. This is equivalent to the object bouncing back from a wall (i.e., the bound). The EA_CYCLE operator applies a modulo function to the result of the ADJUST_ATTRIB, but the addend itself is not disturbed.

EA_RANDOMNESS refers to constraining the random value applied during an ADJUST_ATTRIB event. Minimum and maximum values of bounds are specified as parameters. An ADJUST_ATTRIB event with a EA_RANDOM modifier can have constraints set on both its EA_RANDOMNESS and its EA_ADJUSTBOUNDS.

Computer system 100 allows for the specification of a callback function to be invoked to manage an event. Event management callbacks are set with the EASetConstraintCallback function. The EAGetAdjustConstraint function retrieves parameters for the constraining conditions that were imposed on an event. The EAClearConstraint function clears a previously set constraint. The EAGetConstraintCallback retrieves the callback function associated with a specified event condition.

Event conditions upon which callbacks can be set are: EVENT_COMPLETE, ADJUST_ATTRIB, and ADJUST_OVERFLOW. The EVENT_COMPLETE condition occurs when a specified scheduled event is completed. The ADJUST_ATTRIB condition occurs when a specified object's attribute is adjusted. By creating the original event with an absolute addend of zero, a function can apply a non-standard adjustment to an attribute. The ADJUST_OVERFLOW condition occurs when an overflow of specified bounds occurs when a specified object's attribute is adjusted. Using this condition, an object can be manipulated when it moves past specified bounds.

Audio Functions

Those skilled in the art will understand that there exist audio managers that export audio APIs which can be appropriately modified and integrated into the computer system of the present invention to provide and support audio functionality that can be synchronized with the other functionalities provided by the computer system. In a preferred embodiment, the audio manager uses the event scheduler via the event coordination API to schedule and coordinate audio activities with the other activities of the computer system.

Communications Functions

Those skilled in the art will understand that a comm manager can be designed for the computer system of the present invention to provide the capability of communicating over a network or other communications link with similar computer systems residing in other nodes. It will be further understood that remote procedure call capabilities can be designed into that comm manager to provide the ability to invoke the remote computer system's API functions. This may provide the capability, for example, for two or more users of remote computer systems to play along side each other or against each other in the same interactive game.

Service Provider Interface

Display mixer SPI 228 of FIG. 2 defines a set of functions called by object libraries 222–226 to control the operations of display mixer 220. The display mixer SPI functions are exported by the display mixer 220 of FIG. 2. The display mixer SPI functions include the following:

EACreateObject
EADeleteObject
EASetDrawFunction
EASetMsgFunction
EASetWidth
EAGetWidth
EASetHeight
EAGetHeight The display mixer SPI functions are defined in further detail in Appendix B of the '699 application.

An object library calls the EACreateObject function to tell the display mixer to create an object. The display mixer returns a handle for the newly created object. When the EACreateObject function is called, the attributes that are valid for that object are specified in a DWORD bitfield called dwValidAttribs, which has the following bits defined:

| Bit | Name | Attribute |
| --- | --- | --- |
| 0x01 | VA_DRAW_ORDER | Draw Order |
| 0x02 | VA_VISIBILITY | Visibility |
| 0x04 | VA_POSITION | Position |
| 0x08 | VA_VIEW | View |
| 0x10 | VA_SEQUENCED | Sequenced |
| 0x11 | VA_DESTINATION | Destination |

The display mixer saves these bits to determine which attribute functions are permitted for that object. In addition, when the EACreateObject function is called, default values for the attributes may be assigned using a DEFAULT_ATTRIBS structure, which is defined as follows:

```
typedef struct
{
    DWORD dwDrawOrder;   // draw order
    BOOL  bVisibility;   // visibility
    long  lPosX;         // x position for the object on the surface
    long  lPosY;         // y position for the object on the surface
    long  lViewX;        // left edge of the view within the object
    long  lViewDX;       // width of the view of the object
    long  lViewY;        // top edge of the view within the object
    long  lViewDY;       // height of the view within the object
    long  lSeqSize;      // number of images in sequenced object
                         // (1 for non-sequenced objects)
} DEFAULT_ATTRIBS;
```

The EADeleteObject function tells the display mixer to delete a specified object.

An object library calls the EASetDrawFunction function to pass to the display mixer a pointer to the draw function for that object library. The display mixer saves this draw function pointer for future use, along with similar draw function pointers for all of the other object libraries. When the application calls the EADraw function into the surface/attribute manager, the display mixer uses the draw function pointers to instruct the object libraries to draw their objects to the surface. The display mixer determines the sequence for instructing the object libraries to draw the objects based on the relative draw order values assigned to the objects.

When it is time for objects to be drawn to a surface, the application calls the EADraw function into the surface/attribute manager. In response, the display mixer instructs the object libraries to draw their objects to the surface. When the display mixer instructs an object library to draw its object, the display mixer uses an EADRAW_PARAMS structure to pass draw parameters to the object library for controlling the drawing of the object. The EADRAW_PARAMS structure is defined as follows:

```
typedef struct
{
    long lTime;              // time to be used by object library to
                             // select image to draw (for those object
                             // libraries that select images based
                             // on time)
    long lSeqIndex;          // index for a sequenced object, to be used
                             // by object library to select image to be
                             // drawn (for those object libraries that
                             // select images based on sequence index)
    RECTWH rwhSurfView;      // dimensions of the surface to which
                             // to draw object (used for clipping
                             // to ensure that objects are not drawn
                             // off the edges of the surface)
    POINTL ptlObjPos;        // location within surface to which to draw
                             // object
    RECTWH rwhObjView;       // view within object to draw
    WORD wDstSel;            // selector for the memory where the
                             // object is to be drawn
    WORD wAlign;             // dummy variable space to ensure
                             // DWORD alignment of subsequent fields
    DWORD dwDstOff;          // offset for the memory where the
                             // object is to be drawn
    long lStride;            // distance in bytes in the memory between
                             // vertically adjacent pixels
    DWORD dwBitCount;        // number of bits per pixel on the surface
} EADRAW_PARAMS;
```

An object library calls the EASetMsgFunction function to pass to the display mixer a pointer to a function which can be used to turn on and off effects that are to be applied to an object of that object library. The display mixer saves this message function pointer for future use, along with similar message function pointers for other object libraries. EASetMsgFunction is also used to install and execute any object-specific event that the application may create using the EACreateEvent function. Object-specific events are events not recognized by the display mixer as one of the generic events.

When an application wants an effect applied to an object, the application calls the EASetEffect function into the surface/attribute manager. In response, the display mixer uses the saved message function pointer to instruct the object library to apply the appropriate effect to the object before drawing the object to the surface. When the display mixer calls the saved message function, it identifies the object and the effect to be applied. The display mixer also passes a message value and a pointer to an unspecified structure. The message value is one of the following values:

| | | |
|---|---|---|
| EA_EFFECT_SET | 1 | // tells object library to apply the effect on the object |
| EA_EFFECT_SET_ORDER | 2 | // indicates that the unspecified structure contains a value to be used by the object library to determine the order in which the effect is applied to the object |
| EA_EFFECT_SET_PARAMS | 3 | // indicates that the unspecified structure contains one or more new parameter values for the effect |
| EA_EFFECT_GET_ORDER | 4 | // indicates that the current order for the effect is to be returned to the display mixer in the unspecified structure |
| EA_EFFECT_GET_PARAMS | 5 | // indicates that the current parameters for the effect are to be returned to the display mixer in the unspecified structure |
| EA_EFFECT_CLEAR | 6 | // tells object library to stop applying the effect on the object |
| EA_EFFECT_QUERY | 7 | // asks the object library whether the object library supports the effect |

An object library calls the EASetWidth function to instruct the display mixer to set the width of the specified object to the specified width. The EAGetWidth function instructs the display mixer to return the width of the specified object to the object library. The EASetHeight function instructs the display mixer to set the height of the specified object to the specified height. The EAGetHeight function instructs the display mixer to return the height of the specified object to the object library.

Relationships Between API and Display Mixer SPI Functions

For some API functions, when the application calls an API function into an object library, the object library responds by calling one or more display mixer SPI functions into the display mixer. For example, when an application calls the EACreateSprite function into the graphics object library, the graphics object library calls the EACreateObject function into the display mixer.

Similarly, for other API functions, when the application calls an API function into the surface/attribute manager, the display mixer responds by calling one or more display mixer SPI functions into the appropriate object library. For example, when the application calls the EADraw function into the surface/attribute manager, the display mixer responds by sequentially calling the draw functions for one or more object libraries to draw their objects to the surface.

For still other API functions, when the application calls an API function into an object library, the object library calls other API functions into the event scheduler. For example, when the application calls the EAAVPlay function into the audio/video object library, the audio/video object library calls the EAScheduleEvent and EARepeatEvent functions into the event scheduler.

These relationships and those for other functions are described in described in Appendices A and B of this specification.

System Operations

Figure 9:
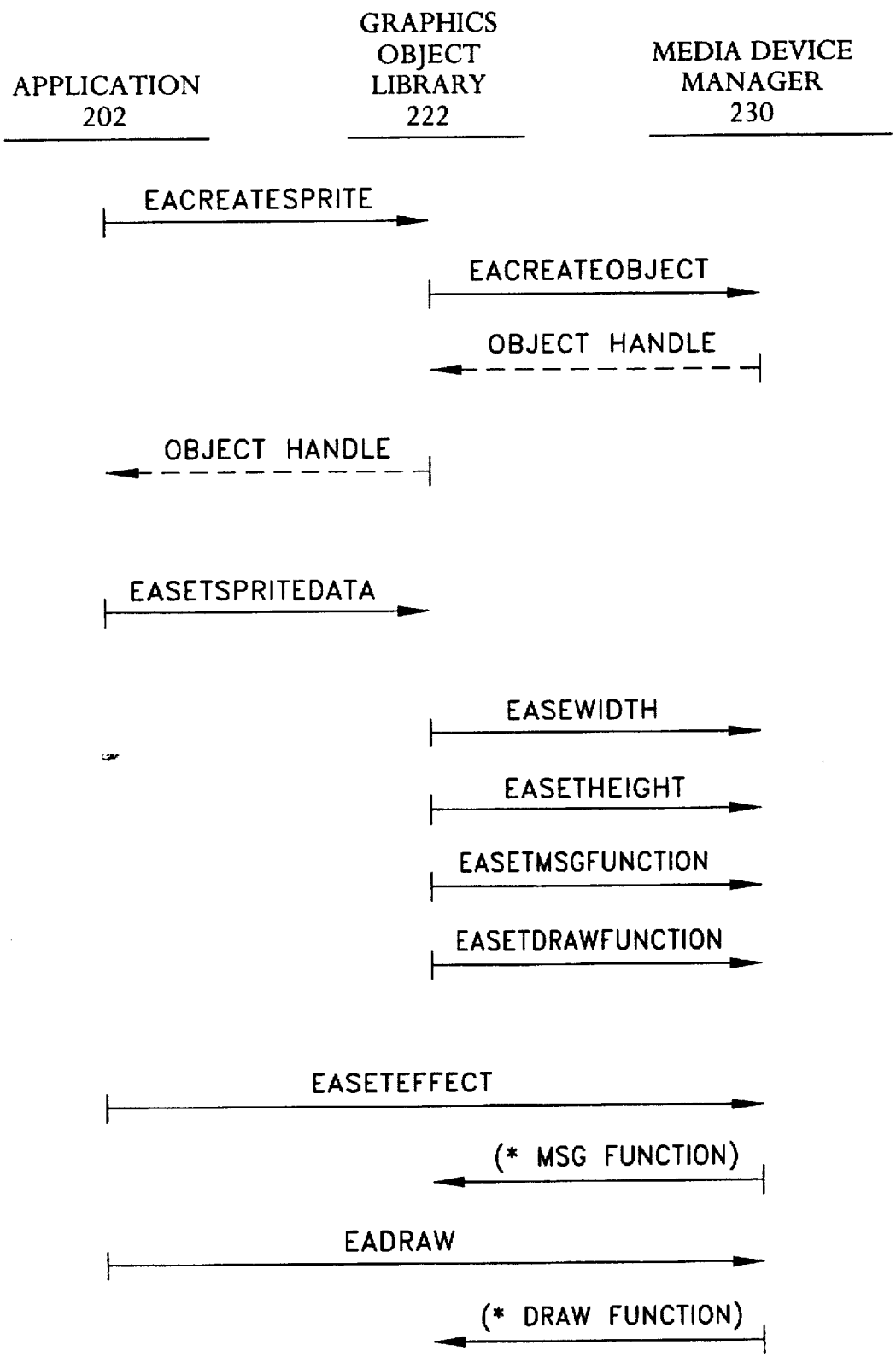
FIG. 9 shows an example of the API and SPI function calls for creating and displaying a sprite in a window on a monitor.

Referring now to FIG. 9, there is shown an example of the API and display mixer SPI function calls for creating and displaying a sprite in a window on a monitor. Application 202 of FIG. 2 creates a sprite by calling the EACreateSprite API function into graphics object library 222 of FIG. 2. In response, the graphics object library calls the EACreateObject SPI function into the display mixer of media device manager 230 of FIG. 2. The display mixer creates the desired object and passes the object handle back to the graphics object library, which in turn passes the object handle for the sprite back to the application.

The application sets the data for the newly created sprite by calling the EASetSpriteData API function into the graphics object library. In response, the graphics object library sequentially calls four SPI functions (EASetWidth, EASetHeight, EASetMsgFunction, and EASetDrawFunction) into the display mixer. The graphics object library calls the EASetWidth and EASetHeight functions into the display mixer to set the width and height of the newly created sprite, respectively. The graphics object library calls the EASetMsgFunction into the display mixer to inform the display mixer of the pointer to the library's message function. Similarly, the graphics object library calls the EASetDrawFunction into the display mixer to inform the display mixer of the pointer to the library's draw function.

To apply an effect to the sprite object, the application calls the EASetEffect API function into the surface/attribute manager of media device manager 230. In response, the display mixer uses the saved message function pointer to call the function into the graphics display library that sets the effect.

To draw the sprite object (with the effect applied) to the monitor, the application calls the EADraw API function into the surface/attribute manager. In response, the display mixer uses the saved draw function pointer to call the function into the graphics display library that draws the object to the surface for display in a window on the monitor.

Software Implementation

Flexible Architecture

Media device manager 230 of FIG. 2 and its associated API 204 and display mixer SPI 228 provide an infrastructure that can support a wide variety of computer operations. For example, as described above, application 202 may be a computer game application and object libraries 222-226 may include graphics and audio/video object libraries that provide graphics and audio/video data to be displayed as part of the computer game. In general, the infrastructure of the present invention supports any application that uses API 204. For example, application 202 may be a computer game application, an encyclopedia application, an interactive video application, an audio/video conferencing application, or an audio/video broadcast application.

Moreover, the infrastructure of the present invention is expandable in that custom object libraries and effects can be added to the system software architecture of FIG. 2. This is enabled by the existence of display mixer SPI 228 which allows the custom object libraries and effects to be added between an application 202 and display mixer 220. The custom object libraries may also export API functions in addition to or other than those defined for API 204 so long as the additional API functions are supported by application 202. Object libraries 222-226 may include, for example, object libraries for two-dimensional graphics, audio/video, three-dimensional graphics, vibrations and other mechanism motions, or even smells and tastes.

Another flexible feature of the infrastructure of the present invention relates to hardware scalability. Hardware scalability refers to the ability of computer systems of the present invention to implement certain functions either (1) with software running on the host processor or (2) using peripheral hardware components. For example, by using separate hardware to perform an effect such as scaling (i.e., increasing or decreasing the size of a bitmap), the processing bandwidth of the computer system may be increased.

In one embodiment, the media device manager determines the presence of such peripheral hardware components by interrogating to determine what hardware and software components are configured in the system. The media device manager may then perform profiling (i.e., off-line processing of test images using different configurations of the available hardware and software components) to determine which configuration provides optimal performance for use during real-time processing. The particular configuration that provides optimal performance is then used during real-time processing.

This hardware scalability of computer systems of the present invention is transparent to the application programmer. The computer system decides which configuration to use and then communicates with the selected hardware in a manner that is transparent to the application program and thus transparent to the application programmer, as well. This removes the device-dependency burden from the application programmer and provides hardware functionality at no additional programming cost.

API-Initiated Run-Time Inheritance

The object libraries export API functions that support the creation and manipulation of objects. The application calls one of these API functions into a particular object library to create a particular type of object. For example, the application may call the EACreateSprite function into a graphics object library to create a sprite.

In response, the object library calls the EACreateObject display mixer SPI function into the display mixer to create a generic object. In doing so, the object library passes to the display mixer a set of parameters specifying the initial values for the generic attributes for that object. The generic attributes are the types of object attributes that the display mixer knows about. The object library also passes to the display mixer a parameter called dwExtraBytes. When the display mixer creates the generic object for the object library, the display mixer allocates a block of memory for the generic attributes. The display mixer also allocates extra bytes in that same memory space corresponding to the value of the dwExtraBytes parameter.

The display mixer returns to the object library a handle to the newly created generic object. The handle is actually a pointer to the beginning of the extra bytes in the memory space that the display mixer allocated for that object. When any module subsequently calls an API function into the media device manager to operate on that object, the module identifies the object by the handle. The media device manager knows how to convert the handle (i.e., the pointer to the extra bytes) into a pointer to the beginning of the memory space allocated for that object in order to manipulate the generic attributes for the object.

Using the handle, the object library can directly access the extra bytes of the memory space allocated for the object. The object library can use these extra bytes of memory space for purposes about which the media device manager is unaware. For example, when the application asks a graphics object library to create a sprite, the graphics object library can use the extra bytes to store those attributes of the sprite that differentiate a sprite from other objects.

This scheme of function calls and memory space allocation may be called API-initiated run-time inheritance. API-initiated run-time inheritance refers to the notion that when the application asks an object library to create a specific type of object (e.g., a sprite) at run time, the object library asks the display mixer to create a generic object. The object library then adds additional attributes and functionality to create the specific type of object from the generic object. The object library's specific object inherits all of the attributes and functionality of the display mixer's generic object. In addition, the specific object also has the specific attributes and functionality that the object library added to the generic object. The media device manager remains responsible for performing all the generic operations to manipulate the generic attributes of the specific object.

This API-initiated run-time inheritance of the present invention differs from other prior-art methods of achieving inheritance. Under a first prior-art method, the application declares a variable of the type corresponding to the derived object (i.e., the specific object). The derived object contains (1) the base object (i.e., the generic object) and (2) the information and functionality added to the base object to make the derived object. The inheritance from the base object to the derived object is established when the derived object is compiled. At application compile time, the compiler allocates enough space for the derived object. At run time, the application can use the derived object and all its functionality.

Under a second prior-art method, the application declares a pointer of the type for the derived object. The inheritance from the base object to the derived object is established at the derived object compile time. At application compile time, the compiler allocates enough space for the pointer only. At run time, the application has to ensure that the pointer is actually pointing to an instance of the derived object. The application accomplishes this by either (1) setting the pointer to the address of another instance of the derived object or (2) having the operating system allocate enough memory to hold an instance of the derived object.

The API-initiated run-time inheritance of the present invention has advantages over the compile-time inheritance of the first and second prior-art methods. With compile-time inheritance, the programmer (i.e., software developer) of the derived object needs a header file describing the data and functions that the base object exports so that they can be passed on to the application developer as part of the required header file for the derived object. With run-time inheritance, on the other hand, the derived object needs only a few simple functions to create and delete the base object. In turn, the derived object can then export similar simple functions to the application to create and delete the derived object.

Run-time inheritance provides at least the two important advantages over compile-time inheritance. First, run-time inheritance more completely encapsulates the implementation of the base object from the derived object and more completely encapsulates the implementation of the derived object from the application. This reduces the amount of information that the developer of an application needs to know about the derived object (i.e., in the object library) and the base object (i.e., in the display mixer). It also reduces the amount of information that the developer of an object library needs to know about the base object (i.e., in the display mixer).

A second important advantage of run-time inheritance over compile-time inheritance is that, since the functions to create derived and generic objects are only called when they are needed, the memory associated with the objects only needs to be present during the time that the object is actually needed. The actual inheritance only happens at run time when the derived object is needed, instead of being inherited at compile time and always present whether it is needed or not. As a result, the total memory requirements and average memory requirements can be reduced.

The API-initiated run-time inheritance of the present invention also differs from a third prior-art method of achieving inheritance, albeit run-time inheritance. Under an MSW operating system, an application can ask the operating system to create a window and to allocate extra memory space associated with that window. If the application wants to access that extra memory space to store and retrieve information, it must call specific MSW API functions. Moreover, the application cannot define a data structure for that memory space to gain symbolic access to that memory space.

This is not the case with the API-initiated run-time inheritance of the present invention, wherein the object library has direct access to the extra bytes allocated by the display mixer using the handle (i.e., pointer) returned by the display mixer to the object library. That is, the object library can access the extra bytes without going through the display mixer. In fact, the object library is free to define whatever data structure it wants for those extra bytes, thereby gaining symbolic access to that memory space. Those skilled in the art will understand that these are significant advantages of the API-initiated run-time inheritance of the present invention over the run-time inheritance provided by the MSW operating system.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A computer-implemented process for handling branching operations during an interactive application, comprising the steps of:
   (a) identifying, by a computer, a possible processing intersection during real-time implementation of the interactive application, wherein:
      the processing intersection corresponds to two or more possible processing paths; and
      each processing path is associated with one or more streams of signals;
   (b) preprocessing, by the computer, each stream of signals of the processing intersection during real-time implementation of the interactive application before reaching the processing intersection;
   (c) selecting, by the computer, one of the processing paths upon reaching the processing intersection in response to flow of the interactive application; and
   (d) further processing, by the computer, the one or more streams of signals associated with the selected processing path.

2. The process of claim 1, wherein each stream of signals is one of a video-only sequence, an audio-only sequence, and an audio/video sequence and step (d) comprises the step of playing the streams of signals associated with the selected processing path.

3. The process of claim 1, wherein step (b) comprises the step of preloading each stream of signals.

4. The process of claim 3, wherein step (b) further comprises the step of partially decompressing each stream of signals.

5. The process of claim 1, wherein step (d) further comprises the step of discarding any non-selected streams of signals.

6. The process of claim 1, wherein each stream of signals is discarded if the processing intersection is avoided during the real-time implementation of the interactive application.

7. The process of claim 1, wherein the processing paths of the processing intersection are identified in a vector table, wherein the vector table is an array of pointers to data structures and each entry in the vector table corresponds to one of the streams of signals.

8. The process of claim 1, wherein the interactive application calls one or more of:
   a create-vector-table function into an object library to create an empty vector table;
   a delete-vector-table function into the object library to delete a specified vector table;
   a set-table-entry function into the object library to identify a specified stream of signals in a specified vector table and to preload the specified stream of signals;
   a choose-table-entry function into the object library to select a specified vector table entry to begin playing a corresponding stream of signals;
   a get-table-entry function into the object library to return a handle of a stream of signals associated with a specified vector table entry to begin playing the associated stream of signals;

a clear-table-entry function into the object library to clear a specified entry from a specified vector table; and a clear-vector-table function into the object library to clear all entries from a specified vector table.

9. The process of claim 1, wherein:

each stream of signals is one of a video-only sequence, an audio-only sequence, and an audio/video sequence and step (d) comprises the step of playing the streams of signals associated with the selected processing path;

step (b) comprises the step of preloading each stream of signals;

step (d) further comprises the step of discarding any non-selected streams of signals;

each stream of signals is discarded if the processing intersection is avoided during the real-time implementation of the interactive application; and the processing paths of the processing intersection are identified in a vector table, wherein the vector table is an array of pointers to data structures and each entry in the vector table corresponds to one of the streams of signals.

10. An apparatus for handling branching operations during an interactive application, comprising:

(a) means for identifying a possible processing intersection during real-time implementation of the interactive application, wherein:
  the processing intersection corresponds to two or more possible processing paths; and
  each processing path is associated with one or more streams of signals;

(b) means for preprocessing each stream of signals of the processing intersection during real-time implementation of the interactive application before reaching the processing intersection;

(c) means for selecting one of the processing paths upon reaching the processing intersection in response to flow of the interactive application; and (d) means for further processing the one or more streams of signals associated with the selected processing path.

11. The apparatus of claim 10, wherein each stream of signals is one of a video-only sequence, an audio-only sequence, and an audio/video sequence and means (d) plays the streams of signals associated with the selected processing path.

12. The apparatus of claim 10, wherein means (b) preloads each stream of signals.

13. The apparatus of claim 12, wherein means (b) partially decompresses each stream of signals.

14. The apparatus of claim 10, wherein means (d) discards any non-selected streams of signals.

15. The apparatus of claim 10, wherein each stream of signals is discarded if the processing intersection is avoided during the real-time implementation of the interactive application.

16. The apparatus of claim 10, wherein the processing paths of the processing intersection are identified in a vector table, wherein the vector table is an array of pointers to data structures and each entry in the vector table corresponds to one of the streams of signals.

17. The apparatus of claim 10, wherein the interactive application calls one or more of:

a create-vector-table function into an object library to create an empty vector table;

a delete-vector-table function into the object library to delete a specified vector table;

a set-table-entry function into the object library to identify a specified stream of signals in a specified vector table and to preload the specified stream of signals;

a choose-table-entry function into the object library to select a specified vector table entry to begin playing a corresponding stream of signals;

a get-table-entry function into the object library to return a handle of a stream of signals associated with a specified vector table entry to begin playing the associated stream of signals;

a clear-table-entry function into the object library to clear a specified entry from a specified vector table; and a clear-vector-table function into the object library to clear all entries from a specified vector table.

18. The apparatus of claim 10, wherein:

each stream of signals is one of a video-only sequence, an audio-only sequence, and an audio/video sequence and means (d) plays the streams of signals associated with the selected processing path;

means (b) preloads each stream of signals;

means (d) discards any non-selected streams of signals;

each stream of signals is discarded if the processing intersection is avoided during the real-time implementation of the interactive application; and the processing paths of the processing intersection are identified in a vector table, wherein the vector table is an array of pointers to data structures and each entry in the vector table corresponds to one of the streams of signals.

19. A storage medium encoded with machine-readable computer program code for handling branching operations during an interactive application, comprising:

(a) means for causing a computer to identify a possible processing intersection during real-time implementation of the interactive application, wherein:
  the processing intersection corresponds to two or more possible processing paths; and
  each processing path is associated with one or more streams of signals;

(b) means for causing the computer to preprocess each stream of signals of the processing intersection during real-time implementation of the interactive application before reaching the processing intersection;

(c) means for causing the computer to select one of the processing paths upon reaching the processing intersection in response to flow of the interactive application; and (d) means for causing the computer to further process the one or more streams of signals associated with the selected processing path.

20. The storage medium of claim 19, wherein each stream of signals is one of a video-only sequence, an audio-only sequence, and an audio/video sequence and means (d) causes the computer to play the streams of signals associated with the selected processing path.

21. The storage medium of claim 19, wherein means (b) causes the computer to preload each stream of signals.

22. The storage medium of claim 21, wherein means (b) causes the computer to partially decompresses each stream of signals.

23. The storage medium of claim 19, wherein means (d) causes the computer to discard any non-selected streams of signals.

24. The storage medium of claim 19, wherein each stream of signals is discarded if the processing intersection is avoided during the real-time implementation of the interactive application.

25. The storage medium of claim 19, wherein the processing paths of the processing intersection are identified in a vector table, wherein the vector table is an array of pointers to data structures and each entry in the vector table corresponds to one of the streams of signals.

26. The storage medium of claim 19, wherein the interactive application calls one or more of:

a create-vector-table function into an object library to create an empty vector table;

a delete-vector-table function into the object library to delete a specified vector table;

a set-table-entry function into the object library to identify a specified stream of signals in a specified vector table and to preload the specified stream of signals;

a choose-table-entry function into the object library to select a specified vector table entry to begin playing a corresponding stream of signals;

a get-table-entry function into the object library to return a handle of a stream of signals associated with a specified vector table entry to begin playing the associated stream of signals;

a clear-table-entry function into the object library to clear a specified entry from a specified vector table; and a clear-vector-table function into the object library to clear all entries from a specified vector table.

27. The storage medium of claim 19, wherein:

each stream of signals is one of a video-only sequence, an audio-only sequence, and an audio/video sequence and means (d) causes the computer to play the streams of signals associated with the selected processing path;

means (b) causes the computer to preload each stream of signals;

means (d) causes the computer to discard any non-selected streams of signals;

each stream of signals is discarded if the processing intersection is avoided during the real-time implementation of the interactive application; and the processing paths of the processing intersection are identified in a vector table, wherein the vector table is an array of pointers to data structures and each entry in the vector table corresponds to one of the streams of signals.

* * * * *